(12) United States Patent
Klimanis

(10) Patent No.: US 10,079,012 B2
(45) Date of Patent: Sep. 18, 2018

(54) CUSTOMIZING SPEECH-RECOGNITION DICTIONARIES IN A SMART-HOME ENVIRONMENT

(71) Applicant: Google LLC, Mountain View, CA (US)

(72) Inventor: Gints Valdis Klimanis, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/692,551

(22) Filed: Apr. 21, 2015

(65) Prior Publication Data

US 2016/0314782 A1    Oct. 27, 2016

(51) Int. Cl.
*G10L 15/065* (2013.01)
*G10L 17/00* (2013.01)
*G10L 15/07* (2013.01)

(52) U.S. Cl.
CPC ............ *G10L 15/065* (2013.01); *G10L 15/07* (2013.01); *G10L 17/00* (2013.01)

(58) Field of Classification Search
CPC ....... H04S 7/305; H04S 7/301; G10L 15/065; G10L 17/00; G10L 15/07
USPC .......................................................... 704/244
See application file for complete search history.

(56) References Cited

U.S. PATENT DOCUMENTS

| | | | |
|---|---|---|---|
| 9,305,554 B2 * | 4/2016 | Jagatheesan | G10L 15/32 |
| 2006/0281435 A1 | 12/2006 | Shearer et al. | |
| 2009/0010460 A1 * | 1/2009 | Diedrichsen | G10K 15/08 |
| | | | 381/300 |
| 2009/0016545 A1 | 1/2009 | Stelliga et al. | |
| 2014/0185828 A1 | 7/2014 | Helbling | |
| 2014/0316778 A1 | 10/2014 | Venkatesha et al. | |
| 2015/0043737 A1 | 2/2015 | Abe et al. | |
| 2015/0120294 A1 * | 4/2015 | Gardner | G10L 15/26 |
| | | | 704/235 |
| 2015/0127340 A1 * | 5/2015 | Epshteyn | G10L 15/26 |
| | | | 704/235 |
| 2015/0283702 A1 * | 10/2015 | Izhikevich | B25J 9/163 |
| | | | 700/257 |

OTHER PUBLICATIONS http://www.soundonsound.com/sos/apr05/articles/impulse.htm.*
https://wiki.inf.ed.ac.uk/twiki/pub/CSTR/ListenSemester1201314/06296524.pdf IEEE Signal Processing Magazine [114] Nov. 2012.*
U.S. Appl. No. 14/692,581, filed Apr. 21, 2015, Non-Final Office Action dated Mar. 23, 2017, all pages.

* cited by examiner

*Primary Examiner* — Bharatkumar S Shah
(74) *Attorney, Agent, or Firm* — Kilpatrick Townsend & Stockton LLP

(57) ABSTRACT

A method for customizing speech-recognition dictionaries for different smart-home environments may include generating, at a smart-home device mounted in an enclosure, an acoustic impulse response for the enclosure. The method may also include receiving, by the smart-home device, an audio signal captured in the enclosure. The method may additionally include performing, by the smart-home device, a speech-recognition process on the audio signal using a second speech dictionary generated by convolving the acoustic impulse response with a first speech dictionary.

20 Claims, 21 Drawing Sheets

CUSTOMIZING SPEECH-RECOGNITION DICTIONARIES IN A SMART-HOME ENVIRONMENT

CROSS-REFERENCES TO RELATED APPLICATIONS

The subject matter of the instant disclosure is related to the subject matter of the following commonly assigned applications, each of which is incorporated by reference herein for all purposes: U.S. Ser. No. 14/692,581, filed on Apr. 21, 2014, entitled "SOUND SIGNATURE DATABASE FOR INITIALIZATION OF NOISE REDUCTION IN RECORDINGS."

BACKGROUND OF THE INVENTION

Some homes today are equipped with smart home networks to provide automated control of devices, appliances and systems, such as heating, ventilation, and air conditioning ("HVAC") systems, lighting systems, alarm systems, and home theater and entertainment systems. Smart home networks may include control panels that a person may use to input settings, preferences, and scheduling information that the smart home network uses to provide automated control the various devices, appliances and systems in the home.

BRIEF SUMMARY OF THE INVENTION

In some embodiments, a method for customizing speech-recognition dictionaries for different smart-home environments may include generating, at a smart-home device mounted in an enclosure, an acoustic impulse response for the enclosure. The method may also include receiving, by the smart-home device, an audio signal captured in the enclosure. The method may additionally include performing, by the smart-home device, a speech-recognition process on the audio signal using a second speech dictionary generated by convolving the acoustic impulse response with a first speech dictionary.

In some embodiments, a smart home device may include a recording device, one or more environmental sensors, one or more processors, and one or more memory devices. The one or more memory devices may include instructions that, when executed by the one or more processors, cause the one or more processors to perform operations including generating an acoustic impulse response for the enclosure in which the smart-home device is installed. The operations may also include receiving, through the recording device, an audio signal captured in the enclosure. The operations may additionally include performing, by the one or more processors, a speech-recognition process on the audio signal using a second speech dictionary generated by convolving the acoustic impulse response with a first speech dictionary.

In some embodiments, a non-transitory, computer-readable medium may include instructions that, when executed by one or more processors, cause the one or more processors to perform operations including generating an acoustic impulse response for the enclosure in which the smart-home device is installed. The operations may also include receiving, through the recording device, an audio signal captured in the enclosure. The operations may additionally include performing, by the one or more processors, a speech-recognition process on the audio signal using a second speech dictionary generated by convolving the acoustic impulse response with a first speech dictionary.

In various implementations, one or more of the following features may be incorporated in any combination and without limitation. The method may also include sending the acoustic impulse response from the smart-home device to a management server; and receiving, by the smart-home device and from the management server, the second speech dictionary, where the management server convolved the acoustic impulse response captured by the smart-home device with the first speech dictionary. The method may additionally include generating, by the smart-home device, a sound approximating an ideal acoustic impulse; and recording, by the smart-home device, an acoustic response of the enclosure to the sound approximating an ideal acoustic impulse. The acoustic impulse response for the enclosure may be generated from the acoustic response of the enclosure. The sound approximating the ideal acoustic impulse may include an electronic click or chirp generated by the smart-home device. Generating the sound approximating the ideal acoustic impulse and recording the acoustic response of the enclosure may occur during a learning interval of the smart-home device. The learning interval may include a time interval within two weeks of an installation of the smart-home device. The smart-home device may further include a wireless network device, where the operations further comprise: sending the acoustic impulse response from the smart-home device to a management server through the wireless network device; and receiving, from the management server through the wireless network device, the second speech dictionary, where the management server convolves the acoustic impulse response captured by the smart-home device with the first speech dictionary to generate the second speech dictionary. The smart-home device may include a hazard detector and the one or more environmental sensors comprises a smoke sensor. The smart-home device may include a thermostat and the one or more environmental sensors comprises a temperature sensor. The enclosure may include a room within a home. The operations may also include receiving input from the one or more environmental sensors indicating that the enclosure is in a first state, where the second speech dictionary may be used by the speech-recognition process when the enclosure is in the first state. The operations may additionally include receiving input from the one or more environmental sensors indicating that the enclosure is in a second state; generating a second acoustic impulse response for the enclosure in the second state; receiving, through the recording device, a second audio signal captured in the enclosure while the enclosure is in the second state; and performing, by the one or more processors, the speech-recognition process on the audio signal using a third speech dictionary generated by convolving the second acoustic impulse response with the first speech dictionary. When the enclosure is in the first state, a door or window of the enclosure may be closed; and when the enclosure is in the second state, the door or window of the enclosure may be open. The first speech dictionary may be stored at the management server and available to a plurality of smart-home devices in a plurality of enclosures. The operations may further include identifying a first user of the smart-home device, where the second speech dictionary may be further personalized to the first user; determining that the audio signal captured in the enclosure comprises human speech by the first user; and using the second speech dictionary for the speech-recognition process in response to determining that the audio signal captured in the enclosure comprises human speech by the first user. The operations may also include transmitting the acoustic impulse response to a second smart-home device in the enclosure over a local smart-home-device network. The operations may additionally include transmitting the second speech dictionary to a second smart-home device in the enclosure over a local smart-home-device network.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF THE INVENTION

Figure 1:
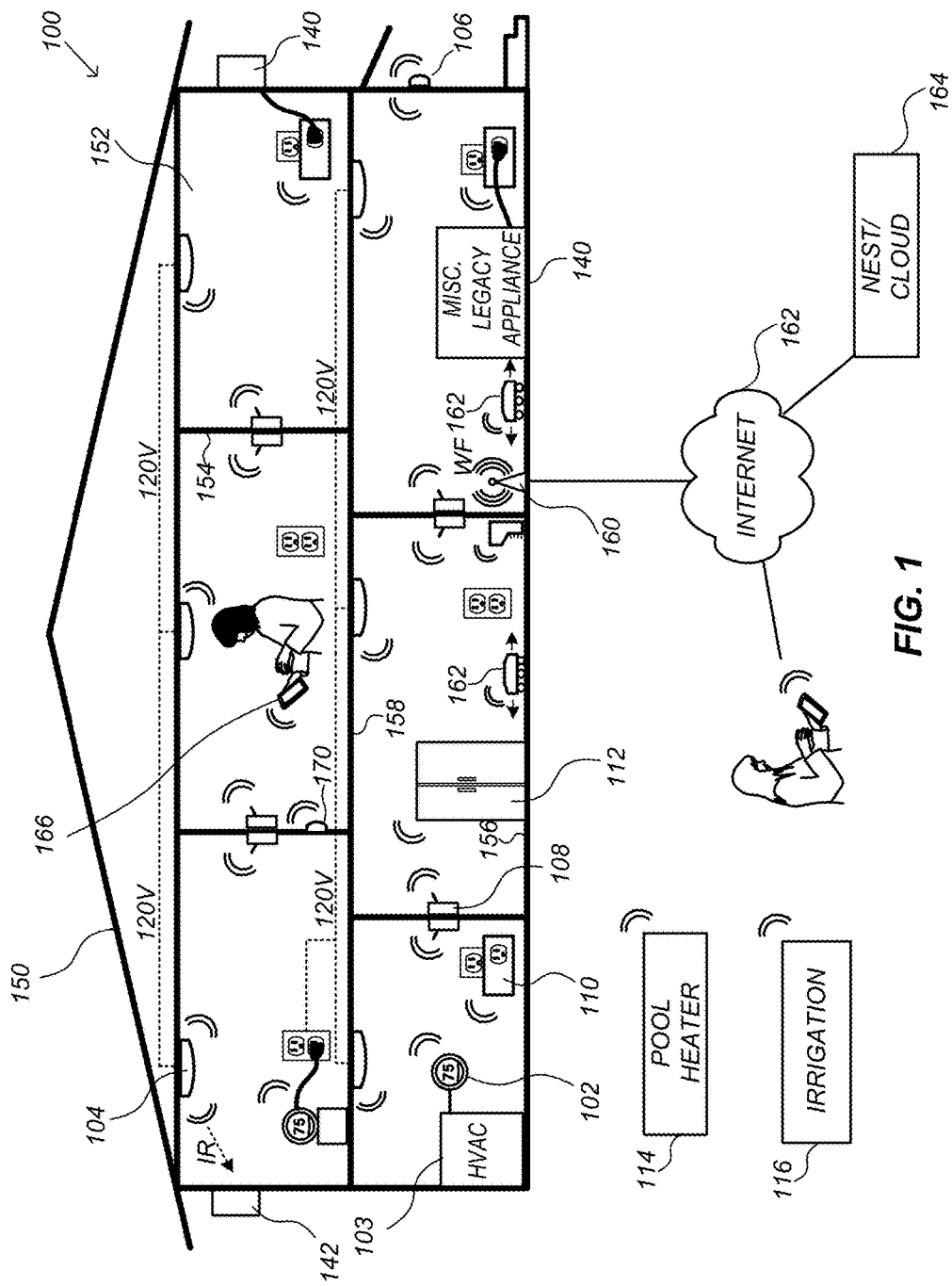
FIG. 1 is an example of a smart-home environment within which one or more of the devices, methods, systems, services, and/or computer program products described further herein will be applicable, according to some embodiments.

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Provided according to one or more embodiments are methods and systems for setting up, pairing, controlling, and/or programming one or more of intelligent, network-connected, multi-sensing hazard detection units or smart hazard detectors. These smart hazard detectors may be configured and adapted to be implemented in a smart home environment, seamlessly interacting with other devices in the smart home environment. The term "smart hazard detector" is used herein to represent a particular type of device that can be used for detecting hazards occurring within a structure, e.g., a home, an office or another structure. However, this smart hazard detector may also be capable of controlling other devices, detecting non-hazard related events (e.g., security related events), and/or working in cooperation with other devices to provide additional features to the smart home environment. Again, it is within the scope of the present teachings for embodiments of the smart hazard detectors of the present invention to detect measurable characteristics other than hazards (e.g., pressure, flow rate, height, position, velocity, acceleration, capacity, power, loudness, and brightness) and monitor and/or respond to one or more measurable characteristics of one or more physical systems.

It is to be appreciated that "smart home environments" may refer to smart environments for homes such as a single-family house, but the scope of the present teachings is not so limited, the present teachings being likewise applicable, without limitation, to duplexes, townhomes, multi-unit apartment buildings, hotels, retail stores, office buildings, industrial buildings, and more generally any living space or work space having one or more smart hazard detectors.

It is to be further appreciated that while the terms user, customer, installer, homeowner, occupant, guest, tenant, landlord, repair person, and the like may be used to refer to the person or persons who are interacting with the smart hazard detector or user interface in the context of some particularly advantageous situations described herein, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments—for example, the password-protected hazard detection functionality described further herein may be particularly advantageous where the landlord holds the sole password and can control hazard detection via the hazard detection device—such identity should not be construed in the descriptions that follow as necessarily limiting the scope of the present teachings to those particular individuals having those particular identities.

Overview of Smart Hazard Detector Capabilities

Turning to the figures, FIG. 1 illustrates an example of a smart-home environment 100 within which one or more of the devices, methods, systems, services, and/or computer program products described further herein can be applicable. The depicted smart-home environment 100 includes a structure 150, which can include, e.g., a house, office building, garage, or mobile home. It will be appreciated that devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes a plurality of devices, including intelligent, multi-sensing, network-connected devices, that can integrate seamlessly with each other and/or with a central server or a cloud-computing system to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 104"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come).

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Still further, in some embodiments, the smart-home environment 100 of FIG. 1 includes a plurality of intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 112 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart wall switches 108, the smart wall plugs 110, and other devices of the smart-home environment 100 are modular and can be incorporated into older and new houses. For example, the devices are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information is then used to obtain data helpful for determining optimal times for watering, such data may include sun location information, temperature, due point, soil type of the land on which the home is located, etc.

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant can use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 makes inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 100. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 166. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques descripted in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 102, 104, 106, 108, 110, 112, 114, and 116 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

According to embodiments, the smart devices combine to create a mesh network of spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices in the smart-home environment 100, such as the spokesman nodes, cannot send information to these low-power nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able send messages across the entire smart-home environment 100 as well as over the Internet 162 to the central server or cloud-computing system 164. According to embodiments, the mesh network enables the central server or cloud-computing system 164 regularly receive data from all of the smart devices in the home, make inferences based on the data, and send commands back to one of the smart devices to accomplish some of the smart-home objectives descried herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 108, 110, 112, and 170) can function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 100. For example, for each room in the house, the user provides a map of the best exit route. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Further included and illustrated in the exemplary smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, Zigbee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's Disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
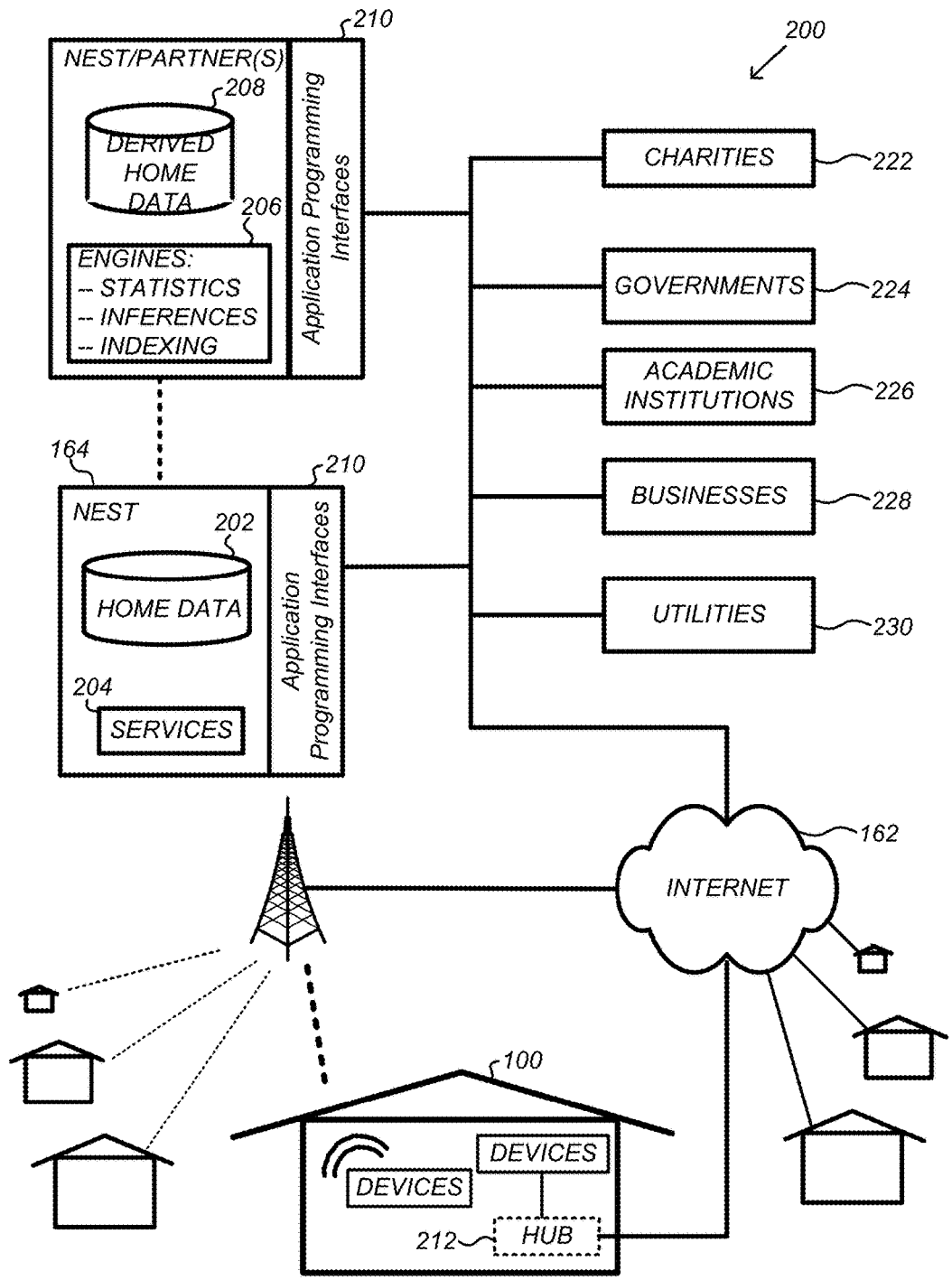
FIG. 2 illustrates a network-level view of an extensible devices and services platform with which the smart-home environment of FIG. 1 can be integrated, according to some embodiments.

FIG. 2 illustrates a network-level view of an extensible devices and services platform 200 with which a plurality of smart-home environments, such as the smart-home environment 100 of FIG. 1, can be integrated. The extensible devices and services platform 200 includes remote servers or cloud computing architectures 164. Each of the intelligent, network-connected devices 102, 104, 106, 108, 110, 112, 114, and 116 from FIG. 1 (identified simply as "smart devices" in FIGS. 2-3 herein) can communicate with the remote servers or cloud computing architectures 164. For example, a connection to the Internet 162 can be established either directly (for example, using 3G/4G connectivity to a wireless carrier), through a hubbed network 212 (which can be a scheme ranging from a simple wireless router, for example, up to and including an intelligent, dedicated whole-home control node), or through any combination thereof.

Although in some examples provided herein, the devices and services platform 200 communicates with and collects data from the smart devices of smart-home environment 100 of FIG. 1, it should be appreciated that the devices and services platform 200 communicates with and collects data from a plurality of smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 routinely collects data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 are coupled to and permit third-party systems to communicate with the central server or the cloud-computing system 164, including the services 204, the processing engine 206, the home data 202, and the derived home data 208. For example, the APIs 210 allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps, that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
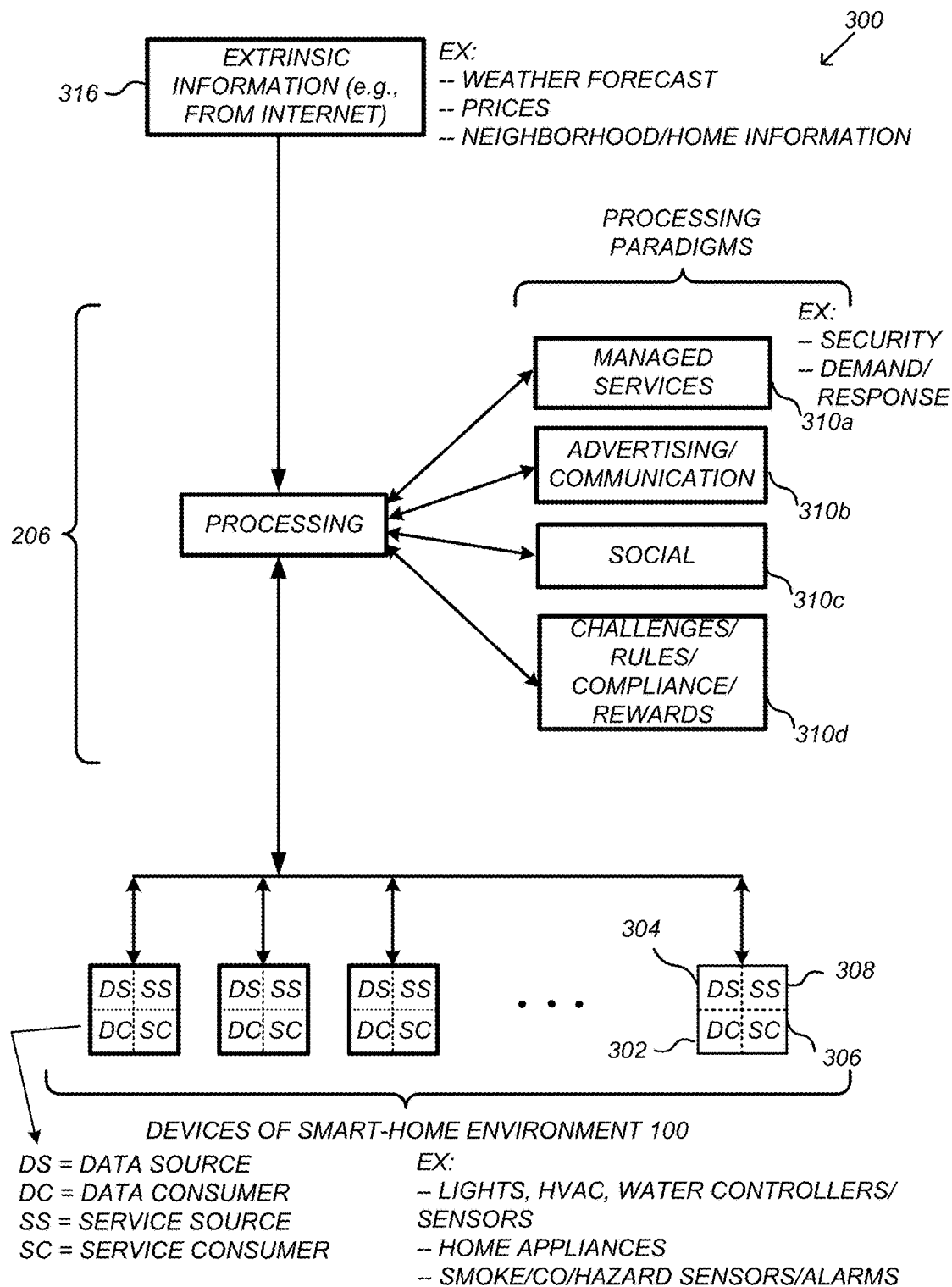
FIG. 3 illustrates an abstracted functional view of the extensible devices and services platform of FIG. 2, with reference to a processing engine as well as devices of the smart-home environment, according to some embodiments.

FIG. 3 illustrates an abstracted functional view of the extensible devices and services platform 200 of FIG. 2, with particular reference to the processing engine 206 as well as devices, such as those of the smart-home environment 100 of FIG. 1. Even though devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 can integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Figure 4A:
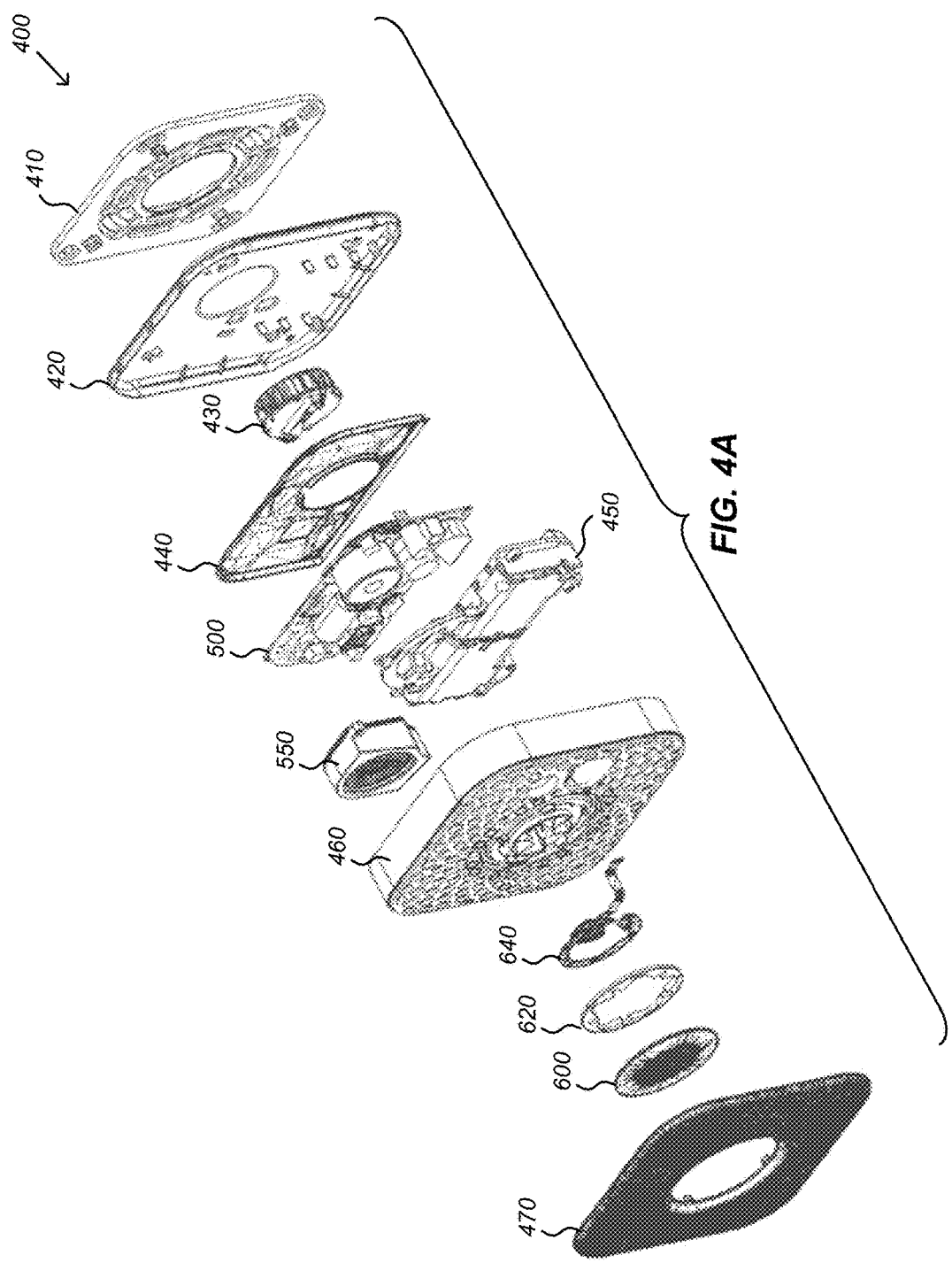
FIGS. 4A-4B illustrate perspective exploded and assembled views, respectively, of an intelligent, multi-sensing, network-connected hazard detector, according to some embodiments.
Figure 4B:
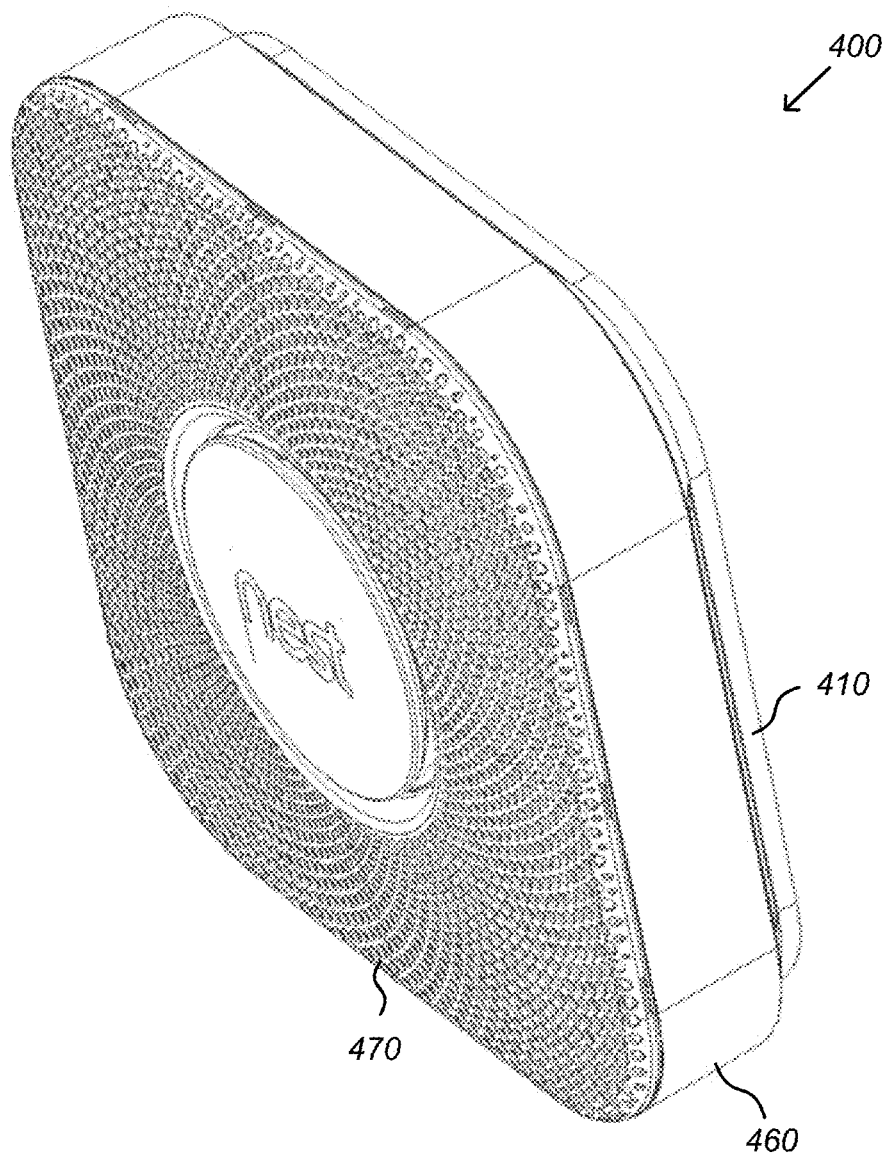

Referring now to FIG. 4A and FIG. 4B, illustrated is a hazard detector 400 that may be used as part of a smart home environment 100 as previously described. FIG. 4A illustrates an exploded perspective view of the hazard detector 400, while FIG. 4B illustrates an assembled view of the same hazard detector 400. In one embodiment, hazard detector 400 is a smoke detector that is configured to detect the presence of smoke and sound an alarm to audibly warn an occupant or occupants of the home or structure of a potential fire or other danger. In other embodiments, hazard detector 400 may be a carbon monoxide detector, heat detector, and the like. In one embodiment, hazard detector 400 is a multi-sensing detector that includes a smoke detector, carbon monoxide detector, heat detector, motion detector, and the like. Many of the present teachings are particularly advantageous for embodiments in which the hazard detector 400 is a multi-sensing detector, particularly since combining the various sensing modes together into a single device can pose substantial challenges with respect to one or more of device compactness, component powering, and overall component governance and coordination.

For convenience in describing the embodiments herein, the device 400 will be referred to hereinbelow as smart hazard detector or hazard detector 400, although it should be realized that hazard detector 400 may include various other devices and that the scope of the present teachings is not necessarily limited to hazard detectors in which smoke is required as one of the anomalies to be detected. Thus, for example, depending on the particular context as would be apparent to a person skilled in the art upon reading the instant disclosure, one or more of the advantageous features and embodiments described herein may be readily applicable to a multifunctional hazard sensor that detects carbon monoxide and motion only, or pollen and motion only, or noise pollution and pollen only, and so forth. Nevertheless, the combining of smoke detection functionality with other sensing functions does bring about one or more particularly problematic issues that are addressed by one or more of the present teachings.

In one embodiment, hazard detector 400 is a roughly square or rectangular shaped object having a width of approximately 120 to 134 mm and a thickness of approximately 38 mm. Stated differently, hazard detector 400 is a multi-sensing unit having a fairly compact shape and size that may be easily attached to a wall or ceiling of a home or structure so as to be able, among other functionalities, to detect the presence of smoke and alert an occupant therein of the potential fire danger. As shown in FIG. 4A, hazard detector 400 includes a mounting plate 410 that may be attached to a wall of the building or structure to secure the hazard detector 400 thereto. Hazard detector 400 also includes a back plate 420 that may be mounted to the mounting plate 410 and a front casing 460 that may be coupled with or otherwise secured to back plate 420 to define a housing having an interior region within which components of the hazard detector 400 are contained. A circuit board 500 may be coupled with or attached to back plate 420. Various components may be mounted on circuit board 500. For example, a smoke chamber 430 may be coupled with or mounted on circuit board 500 and configured to detect the presence of smoke. In one embodiment, smoke chamber 430 may be mid-mounted relative to circuit board 500 so that air may flow into smoke chamber 430 from a position above circuit board 500 and below circuit board 500. A speaker 550 and alarm device (not numbered) may also be mounted on circuit board 500 to audibly warn an occupant of a potential fire danger when the presence of smoke is detected via smoke chamber 430. Other components, such as a motion sensor, carbon monoxide sensor, microprocessor, and the like may likewise be mounted on circuit board 500 as described herein.

In one embodiment, a protective plate 440 may be attached to or otherwise coupled with circuit board 500 to provide a visually pleasing appearance to the inner components of hazard detector 400 and/or to funnel or direct airflow to smoke chamber 430. For example, when a user views the internal components of hazard detector 400, such as through vents in back plate 420, protective plate 440 may provide the appearance of a relatively smooth surface and otherwise hide the components or circuitry of circuit board 500. Protective plate 440 may likewise function to direct a flow of air from the vents of back plate 420 toward smoke chamber 430 so as to facilitate air flow into and out of smoke chamber 430.

Hazard detector 400 may also include a battery pack 450 that is configured to provide power to the various components of hazard detector 400 when hazard detector 400 is not coupled with an external power source, such as a 120 V power source of the home or structure. In some embodiments, a cover plate 470 may be coupled with the front casing 460 to provide a visually pleasing appearance to hazard detector 400 and/or for other functional purposes. In a specific embodiment, cover plate 470 may include a plurality of holes or openings that allow one or more sensors coupled with circuit board 500 to view or see through a surface of cover plate 470 so as to sense objects external to hazard detector 400. The plurality of openings of cover plate 470 may be arranged to provide a visually pleasing appearance when viewed by occupants of the home or structure. In one embodiment, the plurality of openings of cover plate 470 may be arranged according to a repeating pattern, such as a Fibonacci or other sequence.

A lens button 600 may be coupled with or otherwise mounted to cover plate 470. Lens button 600 may allow one or more sensors to view through the lens button 600 for various purposes. For example, in one embodiment a passive IR sensor (not shown) may be positioned behind the lens button 600 and configured to view through the lens button 600 to detect the presence of an occupant or occupants within the home or structure. In some embodiments, lens button 600 may also function as a button that is pressable by a user to input various commands to hazard detector 400, such as to shut off an alarm that is triggered in response to a false or otherwise harmless condition. Positioned distally behind lens button 600 may be a light ring 620 that is configured to receive light, such as from an LED or another light emitting element, and disperse the light within ring 620 to provide a desired visual appearance, such as a halo behind lens button 600. Positioned distally behind light ring 620 may be a flexible circuit board 640 that includes one or more electrical components, such as a passive IR sensor (hereinafter PIR sensor), LEDs, and the like. Flexible circuit board 640 (hereinafter flex ring 640) may be electrically coupled with circuit board 500 to communicate and/or receive instructions from one or more microprocessors mounted on a circuit board (not shown) during operation of hazard detector 400. Additional details of the components of hazard detector 400 are described in FIGS. 5A-D and 6A-F.

FIG. 4B illustrates hazard detector 400 with the various components assembled. Specifically, this figure shows the mounting plate 410, front casing 460, back plate 420, and cover plate 470 in an assembled configuration with the various other components contained within an interior space of hazard detector 400. This figure also shows the plurality of holes or openings of cover plate 470 forming a visually pleasing design that is viewable by occupant of a room within which the hazard detector 400 is mounted. The lens button 600 is shown attached to the hazard detector 400 so as to be centrally positioned with respect to cover plate 470. As briefly described, light ring 620 may be used to provide a halo appearance of light around and behind lens button 600. The assembled hazard detector 400 provides a compact yet multifunctional device.

Figure 5A:
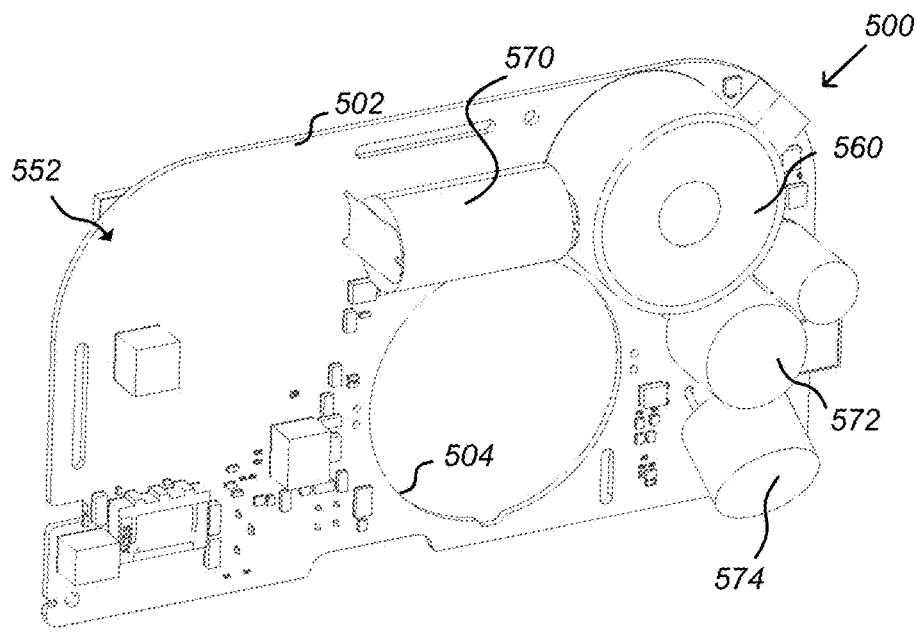
FIGS. 5A-5B illustrate front and rear perspective views of a circuit board of the hazard detector of FIGS. 4A-4B, according to some embodiments.
Figure 5B:
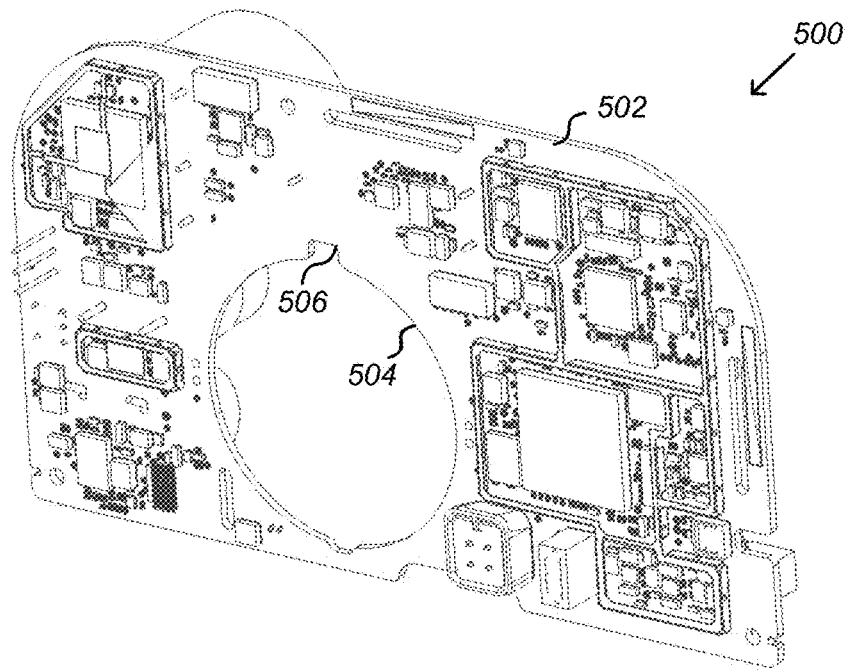

Referring now to FIG. 5A and FIG. 5B, illustrated are front and rear perspective views of circuit board 500. Circuit board 500 includes a main body 502 having a front side or surface and a rear side or surface. As described herein, various electrical components are mounted on circuit board 500. In some embodiments, these components may be mounted on the front surface of circuit board 500, on the rear surface of circuit board 500 opposite the front surface, or on both surfaces of the circuit board 500. For example, in a specific embodiment one or more microprocessors and/or other processor related components may be mounted on the rear surface of circuit board 500 facing protective plate 440 while one or more functional components (e.g. an alarm device, CO detector, speaker, motion sensors, Wi-Fi device, Zigbee device, and the like) are mounted on a front surface of circuit board 500 facing a room of the home or structure in which the hazard detector 400 is positioned. Other components may be mid-mounted relative to circuit board 500 so that opposing surfaces are positioned on opposing sides of the circuit board 500 as described herein.

As shown in FIG. 5A, in a specific embodiment the front surface of circuit board 500 may include a CO detector 570 that is configured to detect the presence of carbon monoxide gas and trigger an alarm device 560 if the carbon monoxide gas levels are determined to be too high. The alarm device 560 (which can be a piezoelectric buzzer having an intentionally shrill or jarring sound) may likewise be mounted on the front surface of circuit board 500 so as to face an occupant of the room in which the hazard detector 400 is positioned to alarm the occupant of a potential danger. Alarm device 560 may be configured to produce one or more sounds or signals to alert the occupant of the potential danger. The front surface may further include an area 552 in which a speaker 550 is positioned. Speaker 550 may be configured to provide audible warnings or messages to the occupant of the room. For example, speaker 550 may alert the occupant of a potential danger and instruct the occupant to exit the room. In some embodiments, speaker 550 may provide specific instructions to the occupant, such as an exit route to use when exiting the room and/or home or structure. Other messages may likewise be communicated to the occupant, such as to alert the occupant that the batteries are low, that CO levels are relatively high in the room, that hazard detector 400 needs periodic cleaning, or alert the occupant of any other abnormalities or issues related to hazard detector 400 or components thereof.

Circuit board 500 may also include one or more motion sensors mounted on the front surface thereof. The motion sensors may be used to determine the presence of an individual within a room or surrounding area of hazard detector 400. This information may be used to change the functionality of hazard detector 400 and/or one or more other devices connected in a common network as described previously. For example, this information may be relayed to a smart thermostat to inform the thermostat that occupants of the home or structure are present so that the smart thermostat may condition the home or structure according to one or more learned or programmed settings. Hazard detector 400 may likewise use this information for one or more purposes, such as to quiet the alarm device (e.g. gesture hush) as described herein or for various other reasons.

In one embodiment, a first ultrasonic sensor 572 and a second ultrasonic sensor 574 may be mounted on the front surface of circuit board 500. The two ultrasonic sensors, 572 and 574, may be offset axially so as to point in slightly different directions. In this orientation, each ultrasonic sensor may be used to detect the motion of an individual based on an orientation of the hazard detector 400 relative to the room and/or occupant. Detecting the motion of the individual may be used to quiet the alarm device as described herein (i.e., gesture hush) or for any other reason. In one embodiment, an axis of the first ultrasonic sensor 572 may be oriented substantially outward relative to hazard detector 400 while an axis of the second ultrasonic sensor 574 is oriented at an angle relative to the axis of first ultrasonic sensor 572. The first ultrasonic sensor 572 may sense motion of an individual when the hazard detector 400 is mounted on a ceiling of the home or structure. Because the first ultrasonic sensor 572 is oriented substantially outward relative to hazard detector 400, the first ultrasonic sensor 572 essentially looks straight down on individuals beneath hazard detector 400. The second ultrasonic sensor 574 may similarly sense motion of the individual when the hazard detector 400 is mounted on a wall of the home or structure. Because the second ultrasonic sensor 574 is oriented at an angle relative to the first ultrasonic sensor 572 and hazard detector 400, the second ultrasonic sensor essentially looks downward toward the floor when the hazard detector 400 is mounted on a wall of the home or structure, rather than looking directly outward as first ultrasonic sensor 572. In one embodiment, the angular offset of the two ultrasonic sensors may be approximately 30° or any other desired value.

In another embodiment, the two ultrasonic sensors, 572 and 574, may be replaced by a single ultrasonic sensor that is configured to rotate within hazard detector 400 so that the single ultrasonic sensor is capable of looking straight outward similar to first ultrasonic sensor 572 or capable of looking downward similar to second ultrasonic sensor 574. The single ultrasonic sensor may be coupled to circuit board 500 via a hinge that allows the ultrasonic sensor to rotate based on the orientation of hazard detector 400. For example, when hazard detector 400 is mounted to a ceiling of the home or structure, gravity may orient the ultrasonic sensor so as to look straight downward; whereas when hazard detector 400 is coupled to a wall of the home or structure, gravity may cause the ultrasonic sensor to rotate via the hinge and look downward toward a floor and relative to hazard detector 400. In another embodiment, a motor may be coupled with the single ultrasonic sensor so as to rotate the ultrasonic sensor based on the orientation of hazard detector 400. In this manner, the ultrasonic sensor may always point in a direction that is likely to detect motion of an individual within the room or space surrounding the hazard detector 400. In yet another embodiment, the single ultrasonic sensor may have a wide field of view that is able to substantially accommodate both mounting positions of the two ultrasonic sensors 572 and 574.

As shown in FIGS. 5A and 5B, body 502 of circuit board 500 also includes a substantially centrally located aperture 504 through which smoke chamber 430 is inserted so as to mid-mount the smoke chamber 430 relative to circuit board 500. Aperture 504 may also include a pair of notches 506 through which wires are inserted to electrically couple the smoke chamber 430 with circuit board 500. As previously described, mid-mounting of the smoke chamber 430 through an aperture 504 allows smoke and air to enter smoke chamber 430 from both the front surface or side of circuit board 500 and the rear surface or side of circuit board 500. Various aspects of the electrical components on the circuit board 500 are now described, the positions thereon of many of which will be apparent to the skilled reader in view of the descriptions herein and FIGS. 5A-5B. Included on the circuit board 500 can be several components, including a system processor, relatively high-power wireless communications circuitry and antenna, relatively low-power wireless communications circuitry and antenna, non-volatile memory, audio speaker 550, one or more interface sensors, a safety processor, safety sensors, alarm device 560, a power source, and powering circuitry. The components are operative to provide failsafe safety detection features and user interface features using circuit topology and power budgeting methods that minimize power consumption. According to one preferred embodiment, a bifurcated or hybrid processor circuit topology is used for handling the various features of the hazard detector 400, wherein the safety processor is a relatively small, relatively lean processor that is dedicated to core safety sensor governance and core alarming functionality as would be provided on a conventional smoke/CO alarm, and wherein the system processor is a relatively larger, relatively higher-powered processor that is dedicated to more advanced features such as cloud communications, user interface features, occupancy and other advanced environmental tracking features, and more generally any other task that would not be considered a "core" or "conventional" safety sensing and alarming task.

By way of example and not by way of limitation, the safety processor may be a Freescale KL15 microcontroller, while the system processor may be a Freescale K60 microcontroller. Preferably, the safety processor is programmed and configured such that it is capable of operating and performing its core safety-related duties regardless of the status or state of the system processor. Thus, for example, even if the system processor is not available or is otherwise incapable of performing any functions, the safety processor will continue to perform its core safety-related tasks such that the hazard detector 400 still meets all industry and/or government safety standards that are required for the smoke, CO, and/or other safety-related monitoring for which the hazard detector 400 is offered (provided, of course, that there is sufficient electrical power available for the safety processor to operate). The system processor, on the other hand, performs what might be called "optional" or "advanced" functions that are overlaid onto the functionality of the safety processor, where "optional" or "advanced" refers to tasks that are not specifically required for compliance with industry and/or governmental safety standards. Thus, although the system processor is designed to interoperate with the safety processor in a manner that can improve the overall performance, feature set, and/or functionality of the hazard detector 400, its operation is not required in order for the hazard detector 400 to meet core safety-related industry and/or government safety standards. Being generally a larger and more capable processor than the safety processor, the system processor will generally consume more power than the safety processor when both are active.

Similarly, when both processors are inactive, the system processor will still consume more power than the safety processor. The system processor can be operative to process user interface features and monitor interface sensors (such as occupancy sensors, audio sensors, cameras, etc., which are not directly related to core safety sensing). For example, the system processor can direct wireless data traffic on both high and low power wireless communications circuitry, access non-volatile memory, communicate with the safety processor, and cause audio to be emitted from speaker 550. As another example, the system processor can monitor interface sensors to determine whether any actions need to be taken (e.g., shut off a blaring alarm in response to a user detected action to hush the alarm). The safety processor can be operative to handle core safety related tasks of the hazard detector 400. The safety processor can poll safety sensors (e.g., smoke, CO) and activate alarm device 560 when one or more of safety sensors indicate a hazard event is detected. The safety processor can operate independently of the system processor and can activate alarm device 560 regardless of what state the system processor is in. For example, if the system processor is performing an active function (e.g., performing a Wi-Fi update) or is shut down due to power constraints, the safety processor can still activate alarm device 560 when a hazard event is detected.

In some embodiments, the software running on the safety processor may be permanently fixed and may never be updated via a software or firmware update after the hazard detector 400 leaves the factory. Compared to the system processor, the safety processor is a less power consuming processor. Using the safety processor to monitor the safety sensors, as opposed to using the system processor to do this, can yield power savings because safety processor may be constantly monitoring the safety sensors. If the system processor were to constantly monitor the safety sensors, power savings may not be realized. In addition to the power savings realized by using safety processor for monitoring the safety sensors, bifurcating the processors can also ensure that the safety features of the hazard detector 400 always work, regardless of whether the higher level user interface works. The relatively high power wireless communications circuitry can be, for example, a Wi-Fi module capable of communicating according to any of the 802.11 protocols.

By way of example, the relatively high power wireless communications circuitry may be implemented using a Broadcom BCM43362 Wi-Fi module. The relatively low power wireless communications circuitry can be a low power Wireless Personal Area Network (6LoWPAN) module or a ZigBee module capable of communicating according to an 802.15.4 protocol. For example, in one embodiment, the relatively low power wireless communications circuitry may be implemented using an Ember EM357 6LoWPAN module. The non-volatile memory can be any suitable permanent memory storage such as, for example, NAND Flash, a hard disk drive, NOR, ROM, or phase change memory. In one embodiment, the non-volatile memory can store audio clips that can be played back using the speaker 550. The audio clips can include installation instructions or warnings in one or more languages. The interface sensors can includes sensors that are monitored by the system processor, while the safety sensors can include sensors that are monitored by the safety processor. Sensors 220 and 232 can be mounted to a printed circuit board (e.g., the same board processor 210 and 230 are mounted to), a flexible printed circuit board, a housing of system 205, or a combination thereof.

The interface sensors can include, for example, an ambient light sensor (ALS) (such as can be implemented using a discrete photodiode), a passive infrared (PIR) motion sensor (such as can be implemented using an Excelitas PYQ1348 module), and one or more ultrasonic sensors (such as can be implemented using one or more Manorshi MS-P1640H12TR modules). The safety sensors can include, for example, the smoke detection chamber 430 (which can employ, for example, an Excelitas IR module), the CO detection module 570 (which can employ, for example, a Figaro TGS5342 sensor), and a temperature and humidity sensor (which can employ, for example, a Sensirion SHT20 module). The power source can supply power to enable operation of the hazard detector and can include any suitable source of energy. Embodiments discussed herein can include AC line power, battery power, a combination of AC line power with a battery backup, and externally supplied DC power (e.g., USB supplied power). Embodiments that use AC line power, AC line power with battery backup, or externally supplied DC power may be subject to different power conservation constraints than battery only embodiments.

Preferably, battery-only powered embodiments are designed to manage power consumption of a finite energy supply such that hazard detector 400 operates for a minimum period of time of at least seven (7), eight (8), nine (9), or ten (10) years. Line powered embodiments are not as constrained. Line powered with battery backup embodiments may employ power conservation methods to prolong the life of the backup battery. In battery-only embodiments, the power source can include one or more batteries, such as the battery pack 450. The batteries can be constructed from different compositions (e.g., alkaline or lithium iron disulfide) and different end-user configurations (e.g., permanent, user replaceable, or non-user replaceable) can be used. In one embodiment, six cells of Li—$FeS_2$ can be arranged in two stacks of three. Such an arrangement can yield about 27000 mWh of total available power for the hazard detector 400.

Figure 5C:
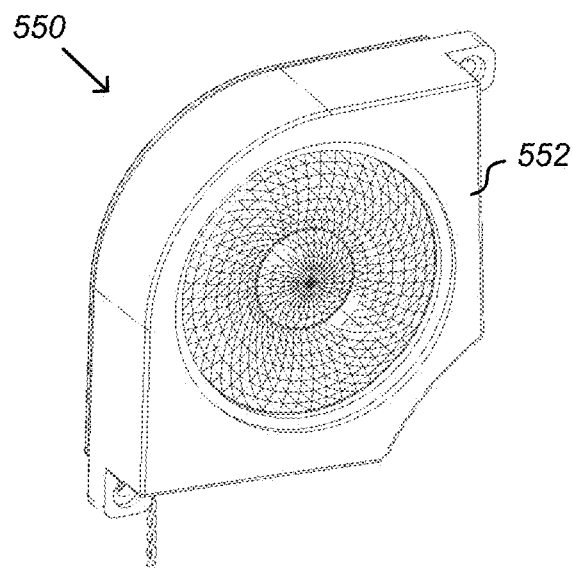
FIGS. 5C-5D illustrate front and rear perspective views of a speaker that is mountable on the circuit board of the hazard detector of FIGS. 4A-4B, according to some embodiments.
Figure 5D:
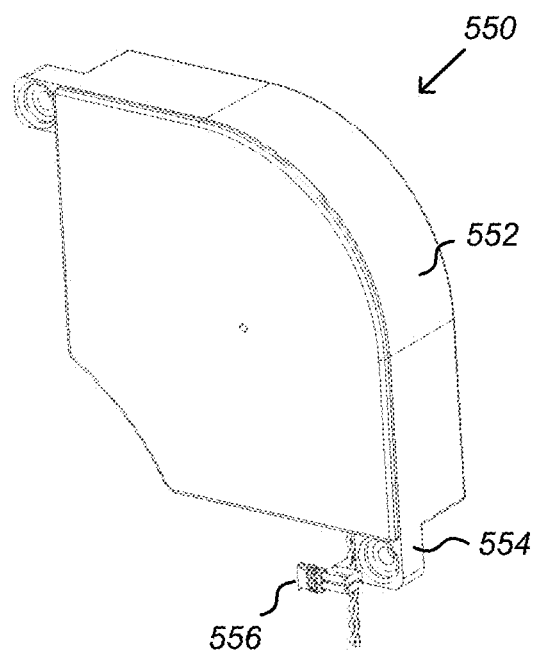

Referring now to FIGS. 5C and 5D, illustrated are front and rear perspective views of a speaker 550 that is electrically coupled with circuit board 500 so as to receive instructions therefrom. Speaker 550 includes a speaker body 552 and one or more mounting flanges 554 that allow the speaker 550 to be coupled with or mounted on front casing 460. Speaker 550 also includes a plug 556 or other mounting component that allows the speaker 550 to be electrically coupled with circuit board 500. As previously described, speaker 550 may be used to audibly alert an occupant of a room within which hazard detector 400 is positioned, or to provide other messages to the occupant of the room. For example, speaker 550 may be used to alert a firefighter or other rescuer regarding the occupants remaining in the home or structure after a fire or other danger is detected or may be used to inform an occupant of a safest route out of the home or structure.

Figure 6A:
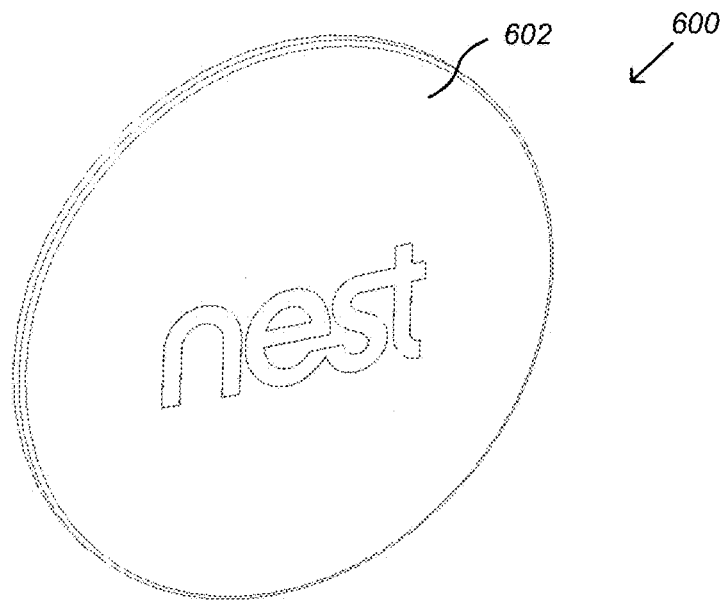
FIGS. 6A-6B illustrate front and rear perspective views of a lens button of the hazard detector of FIGS. 4A-4B, according to some embodiments.
Figure 6B:
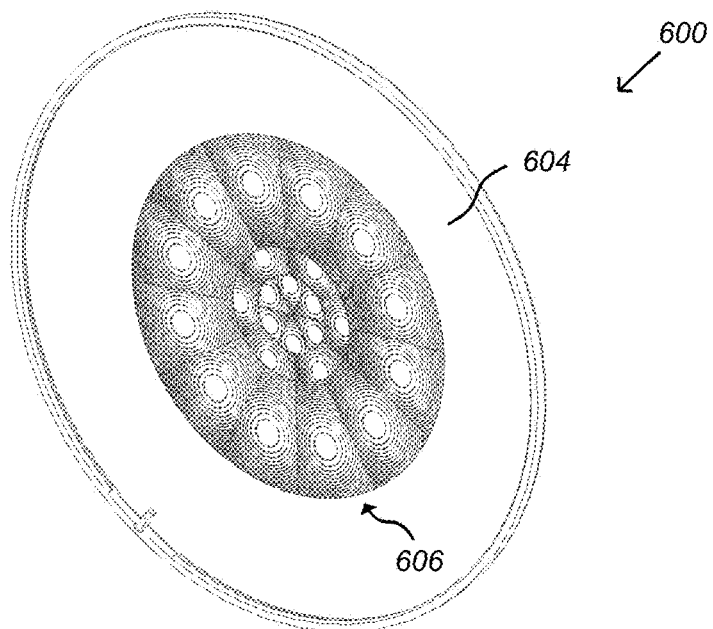

Referring now to FIGS. 6A and 6B, illustrated are front and rear perspective views of a lens button 600. Lens button 600 includes a front surface 602 and a rear surface 604. Lens button 600 is configured to be coupled with front casing 460 by attaching lens button 600 to light ring 620, and coupling light ring 620 to a surface portion of front casing 460, as shown in FIG. 4B. Lens button 600 is configured to be pressed by a user to provide input to hazard detector 400 and/or for various other purposes, such as quieting an alarm device. Lens button 600 is further configured to be transparent to one or more sensors positioned behind lens button 600. For example, in one embodiment, a PIR sensor is positioned behind lens button 600. The PIR sensor is able to view external objects through lens button 600 to determine if an occupant is present within a room in which hazard detector 400 is positioned.

The rear surface 604 of lens button 600 may have a Fresnel lens pattern 606 that allows the PIR sensor, or another sensor, positioned behind lens button 600 to view far into the room in which hazard detector 400 is positioned. In one embodiment, Fresnel lens pattern 606 may include a plurality of concentrically arranged rings that each provides a slightly different viewing cone. Each concentrically arranged ring may provide a progressively larger viewing area or cone than rings concentrically arranged and located radially closer to a central axis of lens button 600. In one embodiment, an internal angle of the viewing cones provided by Fresnel lens pattern 606 may vary from between about 15° and about 150° so as to provide a viewing radius on a floor or wall positioned directly in front of the hazard detector 400 at a distance of approximately 10 feet or between about 0.5 m and about 8.8 m. In this manner, the PIR sensor, or other sensor, positioned behind lens button 600 may easily detect the presence of an occupant within a room in which hazard detector 400 is positioned.

Figure 6C:
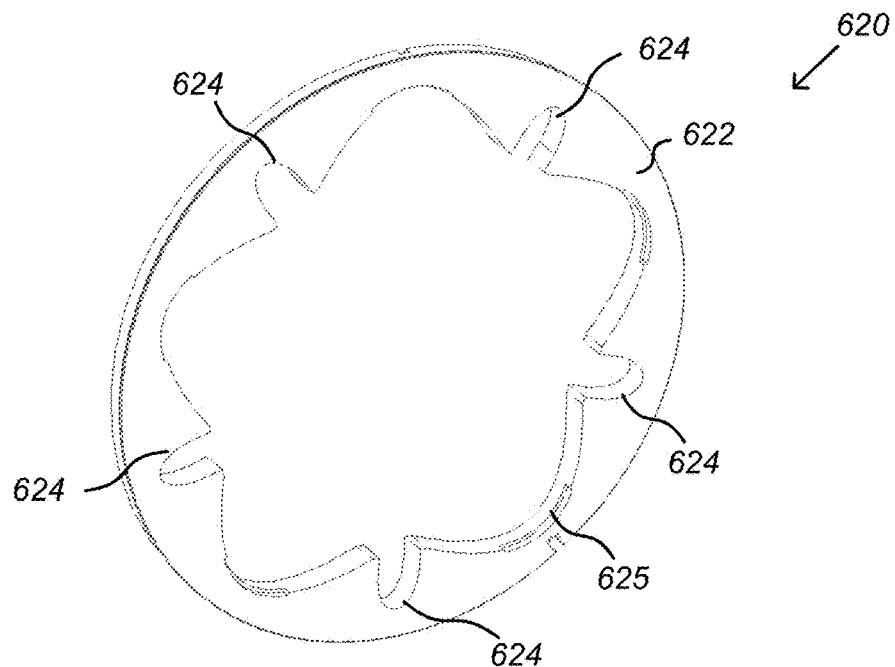
FIGS. 6C-6D illustrate front and rear perspective views of a light guide of the hazard detector of FIGS. 4A-4B, according to some embodiments.
Figure 6D:
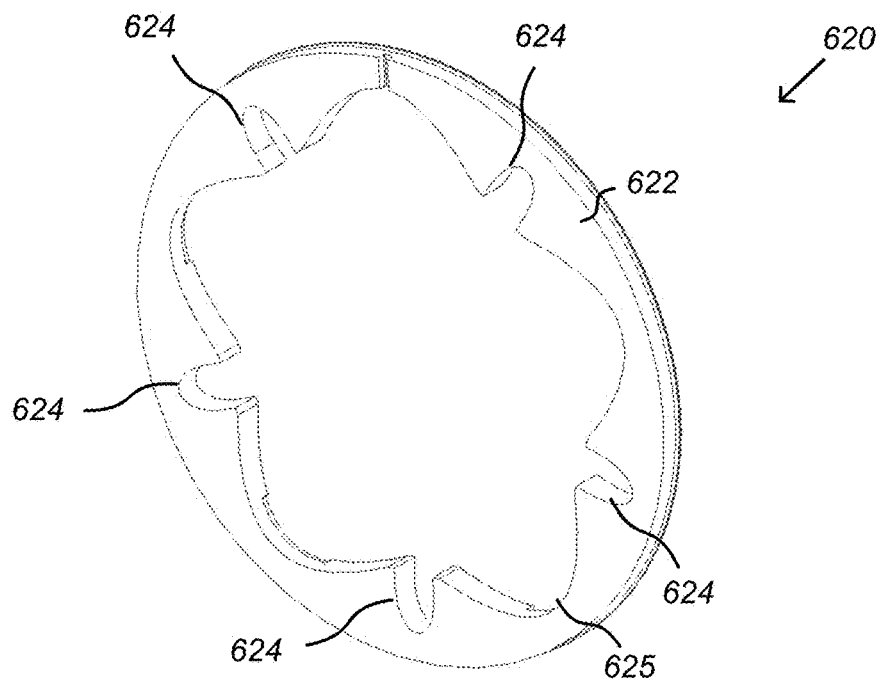

Referring now to FIGS. 6C and 6D, illustrated are front and rear perspective views of a light ring 620 that may be used to disperse light provided by an LED or other light source so as to provide a halo effect behind and around lens button 600. Light ring 620 includes a body portion 622 and may be coupled with lens button 600 via adhesive bonding or any other method known in the art. In turn, light ring 620 may be coupled with front casing 460 such as by orienting light ring 620 with respect to a surface of front casing 460 and pressing light ring 620 axially downward relative to front casing 460 so that recessed portions 625 of light ring 620 mate and couple with tabs (not shown) of front casing 460. These tabs may fit over the recessed portions 625 of light ring 620 and secure light ring 620 adjacent a surface of front casing 460. Light ring 620 also includes a plurality of second recesses 624 within which an LED (not shown) or other light source may be positioned to illuminate light ring 620. In operation, light ring 620 disperses light provided by the LED or other light source to provide a halo effect behind and around lens button 600.

Figure 6E:
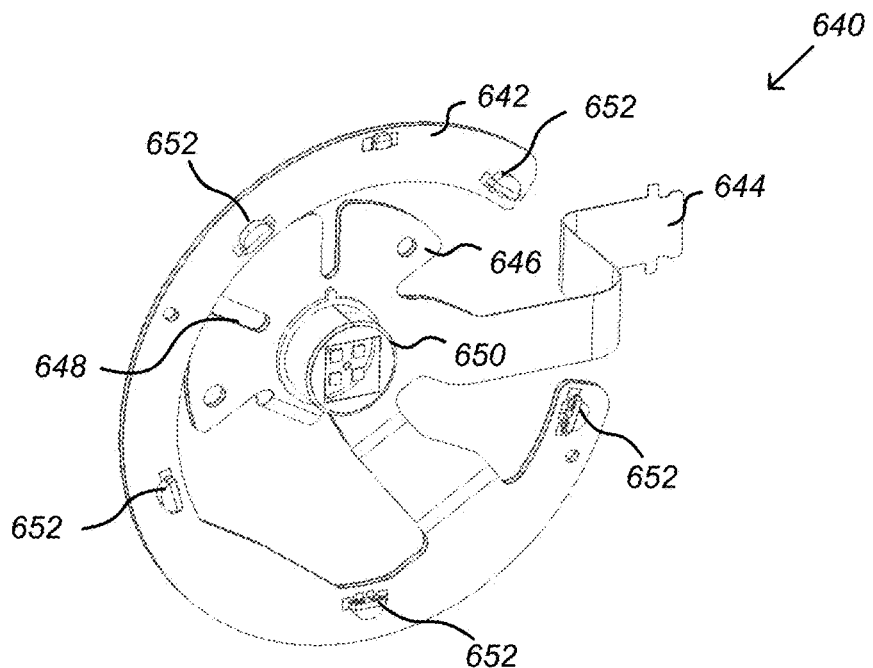
FIGS. 6E-6F illustrate front and rear perspective views of a flexible strip of the hazard detector of FIGS. 4A-4B, according to some embodiments.
Figure 6F:
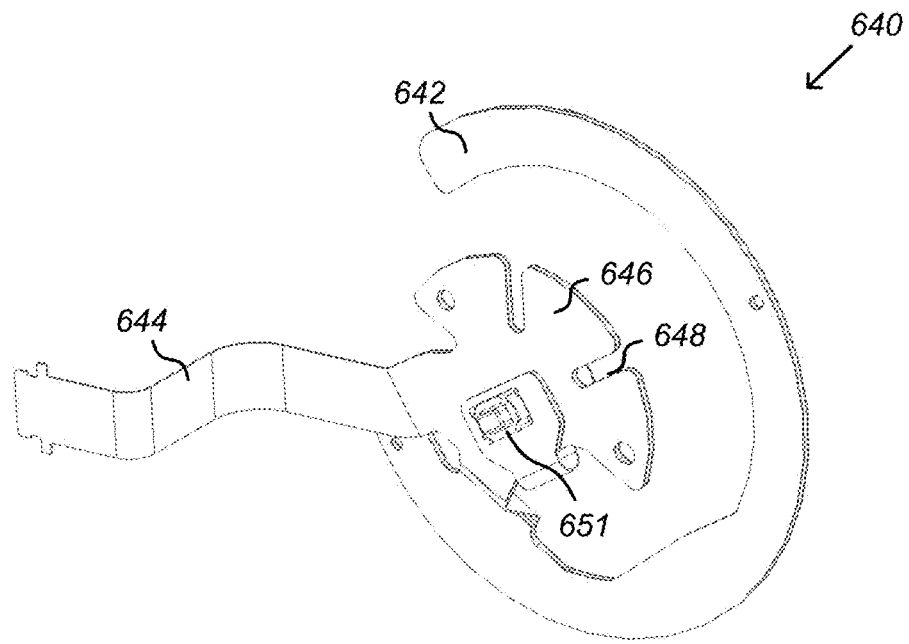

Referring now to FIGS. 6E and 6F, illustrated are front and rear perspective views of a flexible circuit board or flex ring 640 that may electrically couple components positioned in front of circuit board 500, such as lens button 600, with circuit board 500. Flex ring 640 includes a tail end or ribbon 644 that may be insertable into a component of circuit board 500 to electrically couple lens button 600, light ring 620, and/or one or more components with circuit board 500. Flex ring 640 also includes a central portion that may include a PIR sensor 650 that is positioned so as to be behind lens button 600. The central portion of flex ring 640 further includes a plurality of flanges 646 that mate with flanges (not shown) of front casing 460 so as to orient flex ring 640 relative to front casing 460 and/or couple flex ring 640 therewith. Specifically, a channel 648 between flanges 646 may fit around flanges (not shown) of front casing 460 to orient and couple flex ring 640 with front casing 460. Flex ring 640 further includes a circumferentially arranged ring portion 642 having a plurality of LED lights 652, or other source of light, coupled therewith. The plurality of LED lights 652 are arranged so as to be insertable within recessed portions 624 of light ring 620. LED lights 652 illuminate light ring 620 as previously described. A bottom surface of the central portion of flex ring 640 includes a pressable button 651 that is actuated as lens button 600 is pressed by a user. In this manner, input is provided to the hazard detector 400 by the user as previously described.

As mentioned above, embodiments of the present invention, e.g., hazard detectors 104 and 400, may be paired with an online management account. This pairing may be accomplished during the setup process for a smart hazard detector. Examples of this setup process according to the present invention are discussed in the next section.

Custom Speech Dictionaries for Speech Recognition

Many of the smart-home devices described above in FIGS. 1-6 can be modified or designed, in light of this disclosure, to include one or more sound recording devices, such as a microphone. Along with other sensors, a sound recording device can be used to ascertain the state of the environment within an enclosure. Sound inputs can also be used to control any of the devices in the smart home system. For example, an occupant of a home may wish to control a hazard detector using a voice command such as "silence the alarm." As smart-home devices are proliferated within an enclosure, each can be designed with an integrated or add-on sound recording device to form an interconnected network of sound recording stations such that users can control any smart home function from almost anywhere in their home. For example, a user can speak a voice command such as "turn on the dishwasher" that is captured by microphone of a hazard detector in the master bedroom. The hazard detector can then interpret and/or forward the voice command to the dishwasher or other smart appliance. In other scenarios, an interconnected system of microphone-equipped smart-home devices can form an intercom system, an emergency notification system, a home-wide phone system, and/or an environment in which users can verbally command any smart-home device or function from anywhere in their home.

When receiving voice commands or otherwise interpreting human voices, a smart home device may have to deal with interference from a number of different sources. For example, appliances or other background noise sources may be present such that they interfere with intended voice commands. Another challenge faced by smart home devices is the distance between the device and the human user. In order to interpret a voice command, a smart home device must perform a speech recognition algorithm on a received audio signal. Most speech recognition systems rely on high-fidelity sound recordings of the human voice, typically captured by microphone within a few inches of the users mouth. This "close micing" generally ensures a received audio signal that maximizes the human voice signal while minimizing other background noise sources. However, smart home devices, such as thermostats, hazard detectors, alarm systems, and/or entry systems, will typically receive voice commands when the user is at least 1 foot and 20 feet away from the smart home device. When the human user is this far away from a microphone on the smart home device, the voice commands will tend to blend in with the noise of the room.

One particularly troublesome effect of being relatively far away from the microphone when providing a voice command is the natural interference of the room. Both size and acoustic properties of a particular room will have an effect on how a person's voice sounds when being recorded by a smart home device. The same voice will sound different in different rooms because of reverberation—an acoustical phenomena where one phoneme bleeds into the next phoneme to produce a spectral-smearing effect. Speech recognition algorithms generally divide speech up into phonemes—basic units of a language's phonology, somewhat akin to syllables in the English language—and transitions between phonemes. These phonemes and transitions can then be matched with a pre-existing speech recognition database of phonemes, referred to herein as a "speech dictionary." When training a speech dictionary, the training usually takes place in a very controlled environment where the microphone is close to a user's mouth and maintained at a consistent location throughout the training period. Smart home devices may generally use a pre-existing speech dictionary to perform speech recognition algorithms. However, because smart home devices are generally not close to the human user, and because the human user may move between various distances during a single voice command (e.g., a user may be walking towards the smart home device), the spectral smearing effect of the room noise can make it difficult to distinguish one phoneme from the next in the recorded audio of a voice command.

The embodiments described herein can be used to create custom speech dictionaries for individual enclosures (e.g. rooms in a house). A smart home device can generate an audio signal approximating an audio impulse, such as a chirp, a click, or a short beep. The smart home device can then record the acoustic impulse as it reverberates in the room and generate an approximation of the enclosure's acoustic impulse response. This acoustic impulse response can be used to generate a custom speech dictionary from a master speech dictionary that is specific to that particular enclosure. For example, speech dictionaries comprised of electronic representations of individual phonemes can convolve the acoustic impulse response of the enclosure with each phoneme in the speech dictionary, and the resulting phonemes can be stored as a custom speech dictionary that modifies each phoneme to sound as though it were captured in that particular enclosure. The generation of the custom speech dictionary can be done remotely at a management server that will generally have more processing power than individual smart home devices. The resulting custom speech dictionary can be shared with other smart home devices in the same enclosure, or with other smart home devices in different enclosures that have similar acoustic impulse responses. The acoustic impulse response of a room can be determined during a learning interval, and can be refined over time in order to increase the quality of the custom speech dictionary. Custom speech dictionaries can also be generated for enclosures in different states, such as having a window or door opened or closed. Custom speech dictionaries can also be generated for different users in the enclosure.

Figure 7:
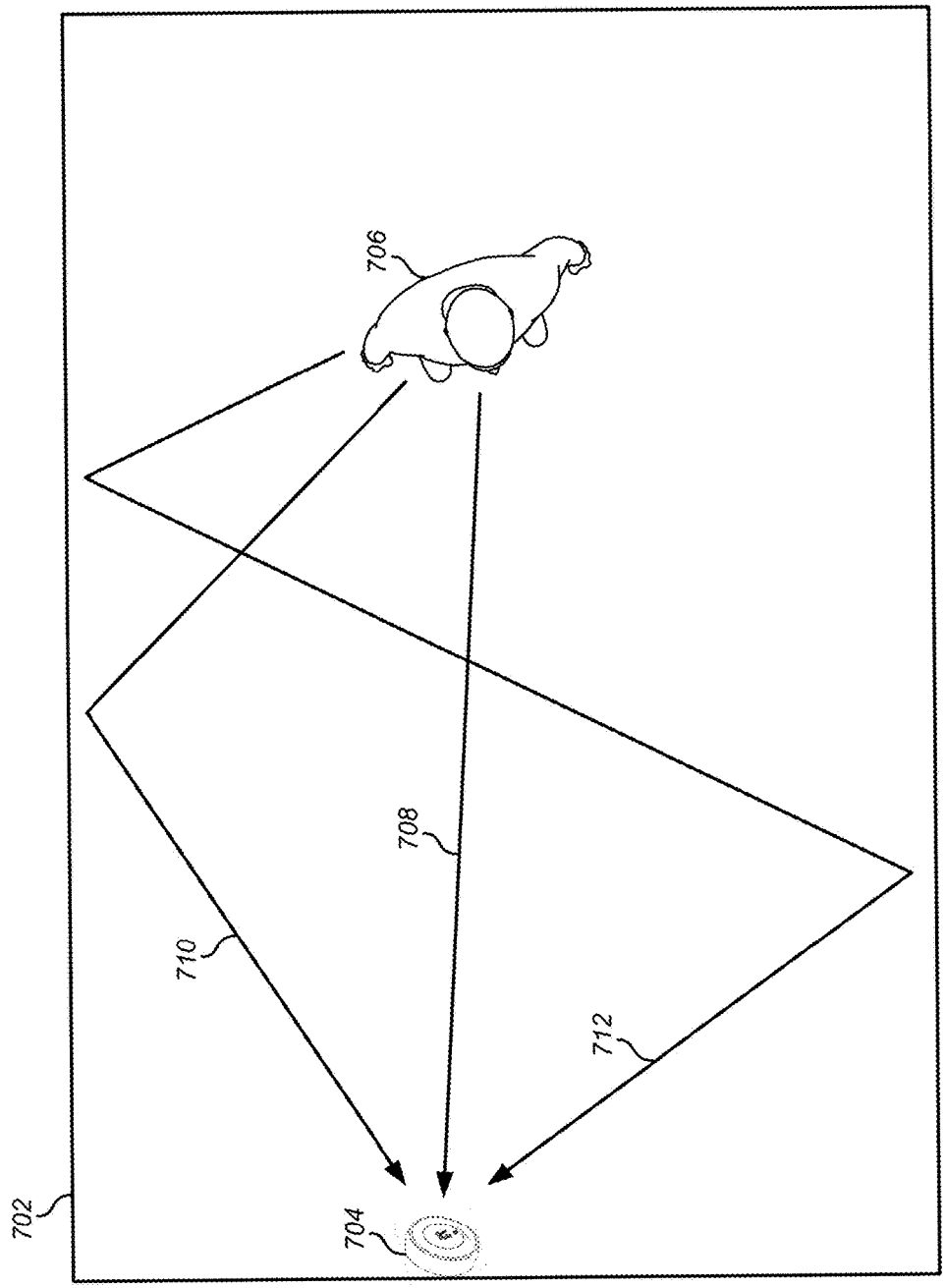
FIG. 7 illustrates a diagram of an enclosure where voice commands can be received by a smart-home device, according to some embodiments.

FIG. 7 illustrates a diagram of an enclosure where voice commands can be received by a smart-home device, according to some embodiments. As used herein, the term "enclosure" can be used to describe an area in which a smart home device is installed. In the example of FIG. 7, the enclosure 702 may be comprised of a room within a house. The room may be separated from other rooms in a house by a door. In other situations, the enclosure may include an open area within the house such as a hallway or dining room area. To interact with the smart home device 704, a user 706 will generally approach the smart home device 704 and issue a voice command. This voice command may often be received at a distance of between 1 and 2 feet from the smart home device 704. However, in other situations the user 706 may provide a voice command from more than 2 feet, such as 5 feet, 10 feet, 15 feet, 20 feet, and so forth. For example, the user 706 may be sitting on the couch watching television and issue a voice command to a thermostat such as "thermostat, increase the temperature by 5°."

When providing a voice command, a number of different audio signals 708, 710, 712 may be received by the smart home device 704. A direct signal 708 may be received first, and may be associated with the most acoustic energy of any of the received signals. Next, a series of reflected signals may be received by the smart home device 704. These reflected signals may be referred to as early reflections 710 that are generally reflected one or two times off of walls or other surfaces in the enclosure 702 before reaching the smart home device 704. These early reflections 710 will generally be received after the direct signal 708 and will generally be associated with less acoustic energy. Finally, a trailing set of late reflections 712 will be received that have been reflected off of a number of surfaces in the enclosure 702. The late reflections 712 will generally tail off in intensity over time, will be received after the early reflections 710, and will be associated with only a relatively small amount of acoustic energy.

Figure 8:
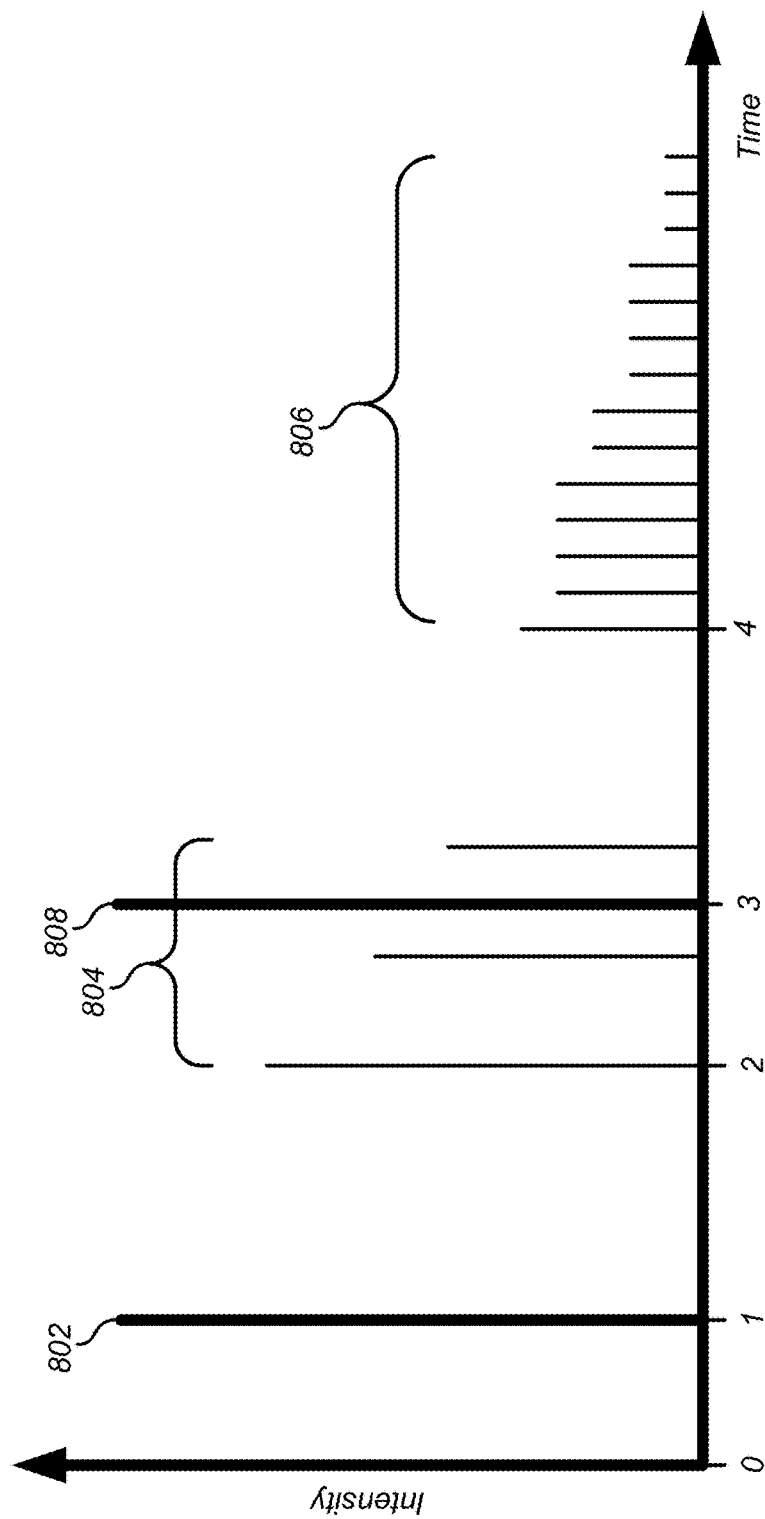
FIG. 8 illustrates a graph of audio reflections within an enclosure, according to some embodiments.

FIG. 8 illustrates a graph of audio reflections within an enclosure, according to some embodiments. The horizontal axis of the graph represents time and the vertical axis of the graph represents acoustic energy, or the intensity of the sound signal received by the smart home device. At time 0, a first phoneme can be pronounced by a user. At time 1, the direct signal 802 can be received by the smart home device. At time 2, the smart home device will begin receiving early reflections 804 of lesser intensity. Finally, at time 4, the smart home device will begin receiving the late reflections 806. These late reflections will gradually dissipate throughout the enclosure as the signal tails off. The early reflections 804 and the late reflections 806 provide a reverberation effect, or echo, for the spoken phoneme.

Voices commands are generally not given as single phonemes. Instead, they are usually received as a string of one or more words. These combination of phonemes tend to smear together as the impulse response of the room, or the reverberation effect, becomes greater. Consider a second phoneme (e.g. the second word in a voice command) that is spoken by the user at some time prior to time 3. A time 3, the direct signal 808 of the second phoneme may be received by the smart home device. Note that at the time that the direct signal 808 of the second phoneme is received, the early reflections 804 and late reflections 806 are still reverberating throughout the room and being received by the smart home device. This effect will make every room somewhat unique, and cause the same voice command from the same user to sound differently in different rooms.

The timing and intensity of the early reflections 804 and the late reflections 806 generally depend on the size and acoustic characteristics of each individual enclosure. In other words, the pattern of the vertical signals illustrated by FIG. 8 can be considered a form of audio fingerprint that will be somewhat unique to each particular enclosure. As will be described further below, this fingerprint can be approximated by an acoustic impulse response for the enclosure. The smart home device can analyze the acoustic properties of an enclosure to generate an acoustic impulse response and then alter a master speech dictionary such that each phoneme sounds as though it were spoken in the particular enclosure.

Figure 9:
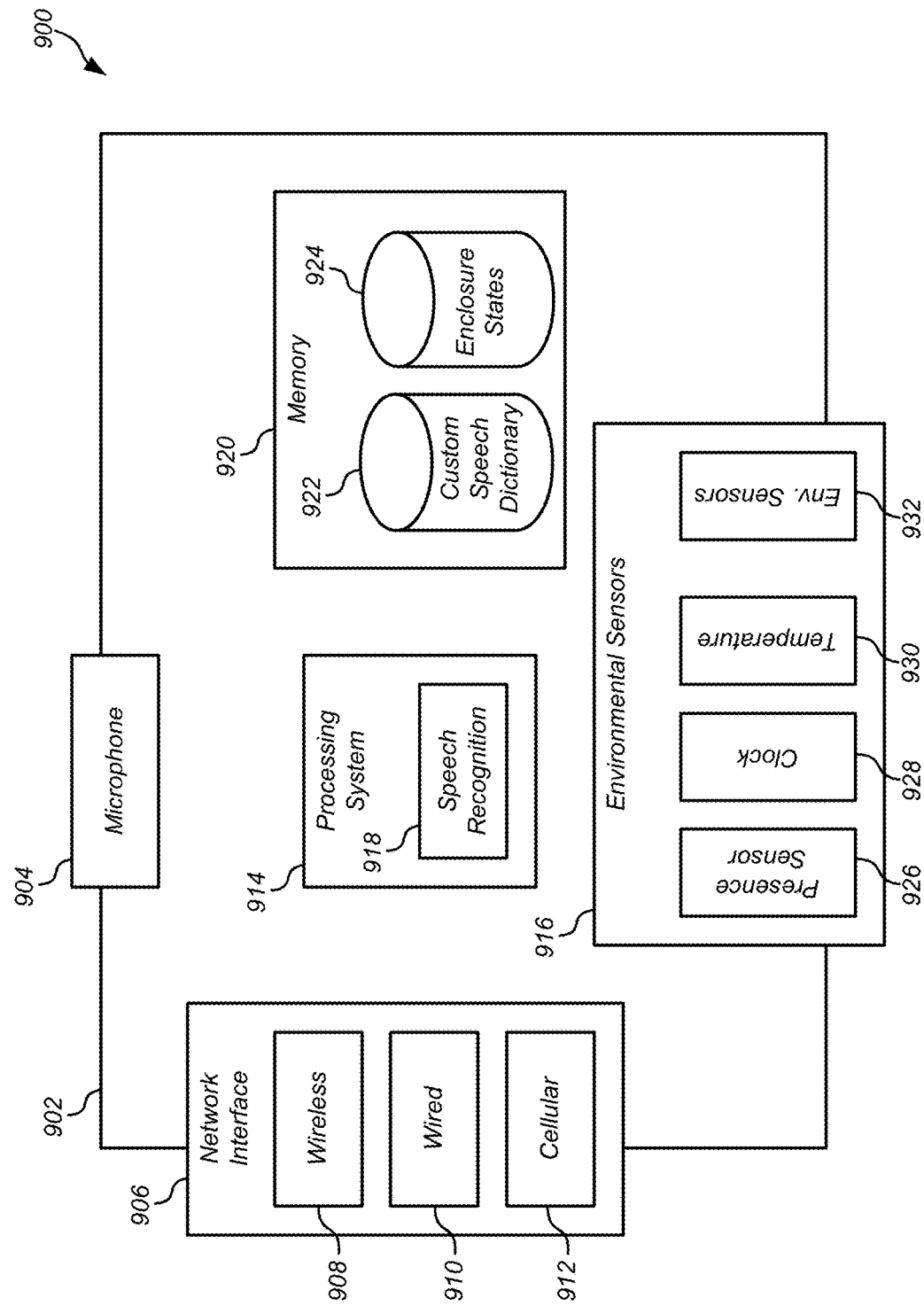
FIG. 9 illustrates a block diagram of a smart-home device architecture, according to some embodiments.

FIG. 9 illustrates a block diagram of a smart-home device architecture, according to some embodiments. This smart-home device 902 may be considered a generic device that may be augmented to perform a number of different functions. For example, the smart-home device 902 may be modified to correspond to the architecture of the hazard detector described above in FIGS. 1-6. The features and systems of the smart-home device 902 may be generically incorporated into a hazard detector, a thermostat, a security system module, a surveillance system module, and/or any other smart device/appliance. For example, a thermostat, hazard detector, etc., may include a network interface 906 that includes a wireless connection 908 (e.g., 802.11, 802.15.4, etc.), a wired connection 910 (e.g. ethernet, coaxial cable, telephone line, DSL, etc.), and/or a cellular connection 912 for communicating with other smart-home devices, management servers, mobile computing devices, and/or the like.

The smart-home device 902 may include one or more environmental sensors 916, such as a presence sensor 926 (e.g., PIR, microwave, etc.), a temperature sensor 930, and/or other environmental sensors 932, such as pressure sensors, light sensors, carbon monoxide detectors, and/or the like. The smart-home device 902 may also include a clock 928. The clock 928 may be implemented internally, or the smart-home device 922 may receive a clock signal from a central server, a cellular service provider, a network connection, or another smart-home device/appliance. These and other environmental sensors can be used to determine what is happening around the smart-home device 922 when a voice signal is received from a user. For example, an environmental sensor 932 such as a door sensor can determine that a door for the enclosure is open when the voice signal is received. This information can be used to access a plurality of available custom dictionaries and select a single custom dictionary that best corresponds to the state of the room (i.e. the door being open).

Additionally, the smart-home device 902 may include a microphone 904 that may be used to capture recorded sound used by a speech recognition algorithm. For embodiments involving smart-home devices that would normally include a microphone, the microphone 904 may simply piggyback on the existing architecture. For example, an intercom system will have modules equipped with microphones, and the embodiments described herein can use these existing microphones for speech recognition. In another example, a thermostat might not typically include a microphone, and thus the thermostat can be modified to include the microphone 904 to accept voice commands and perform speech recognition. In some embodiments, the microphone 904 can remain in a perpetually active state such that it is constantly detecting surrounding sounds. The microphone 904 can be coupled to a processing system 914 that analyzes the surrounding sounds and detects verbal commands or other sound signatures that can be used to generate a response from the smart-home device 902. For example, the processing system 914 can analyze incoming sounds to identify phrases such as "Hello Nest," or "Voice Command" and then respond accordingly. Such a command may trigger the processing system 914 to begin recording sound and/or performing a speech recognition algorithm. In some embodiments, the microphone 904 can activate in response to inputs received from other environmental sensors 916. For example, the microphone 904 can become active and record sounds when the presence sensor 926 determines that an enclosure is occupied or that a user is within the immediate vicinity of the smart-home device 902. Other inputs can be used to activate microphone 902, such as a manual user input (e.g. pressing a button on a thermostat or hazard detector), controlling the smart-home device 902 with a smart phone, or performing a physical hand or arm gesture in view of the smart-home device 902. In some embodiments the microphone 904 can be activated in response to an alarm condition or other detected environmental condition by the smart-home device 902 or other smart-home devices in the enclosure. For example, microphone 904 may be activated in response to a smoke alarm in order to accept voice commands for silencing a hazard detector, contacting an emergency response service, and/or the like.

As described above, the smart-home device 902 may include a processing system 914 configured to receive sounds detected by the microphone 904 and perform one or more speech recognition algorithms. The processing system 914 may include a speech recognition module 918 in software/hardware to perform such algorithms. It will be understood that the processing system 914 may include a dedicated processing system for the microphone 904 and a speech recognition algorithm. In other embodiments, the processing system 914 may comprise a microprocessor or microcontroller that is programmed to perform other operations, such as communicating through the network interface 906, polling and analyzing readings from the environment sensors 916, controlling environmental systems, such as an HVAC system, and/or the like. The processing system 914 may be split among one or more microprocessors and possibly mounted to different circuit boards within the smart-home device 902, such as a back plate circuit board and/or a head unit circuit board.

The smart-home device 902 may also include one or more memories 920 that include a custom speech dictionary data store 922 and an enclosure state data store 924. The custom speech dictionary data store 922 can store a custom speech dictionary of phonemes for a particular language, such as English, that is selected by the user during installation of the smart home device 902. During installation, the user may be presented with a list of available languages, such as English, Spanish, French, German, etc., and one such language may be selected by the user. When generating a custom speech dictionary, the smart home device can provide an indication of the user-preferred language such that the management server generates a custom speech dictionary in the selected language. In some cases, the management server can automatically determine a preferred language based on the location of the smart home device using a GPS signal, an IP address, and/or the like. Additionally, the custom speech dictionary 922 can also store a version of a master speech dictionary that does not customize any phonemes for a particular enclosure. The master speech dictionary can be used as a backup in case no custom speech dictionary is available for a particular enclosure, or in cases where the custom speech dictionary does not perform well during a speech recognition session (e.g., when the enclosure has been changed significantly since the custom speech dictionary for that enclosure was created). The enclosure state data store 924 can store various possible states for the enclosure, along with environmental inputs that have historically been shown to indicate when each enclosure state is likely to occur. For example, a room may have one or more windows open and a door closed. This may correspond to a first state for the enclosure. Sensors such as door sensors and window sensors in a security system of the smart home environment may indicate such a state. Other inputs, such as appliances, which when operating would affect the acoustic characteristics of a room, can also be used to define a corresponding enclosure state. Environmental inputs can be used to select among the available enclosure states in the enclosure state data store 924, and the selected state can be used to select a custom speech dictionary from the custom speech dictionary data store 922.

The arrangement of modules and functions as illustrated in FIG. 9 is merely exemplary and not meant to be limiting. Other embodiments may add additional modules, such as additional environmental sensors, additional network communication options, different memory configurations, and distributed processing systems. Therefore, it will be understood that each module in FIG. 9 may be combined with other modules or subdivided into additional sub-modules as needed. Additionally, each module may be implemented in hardware, software, or a combination of hardware/software.

Figure 10:
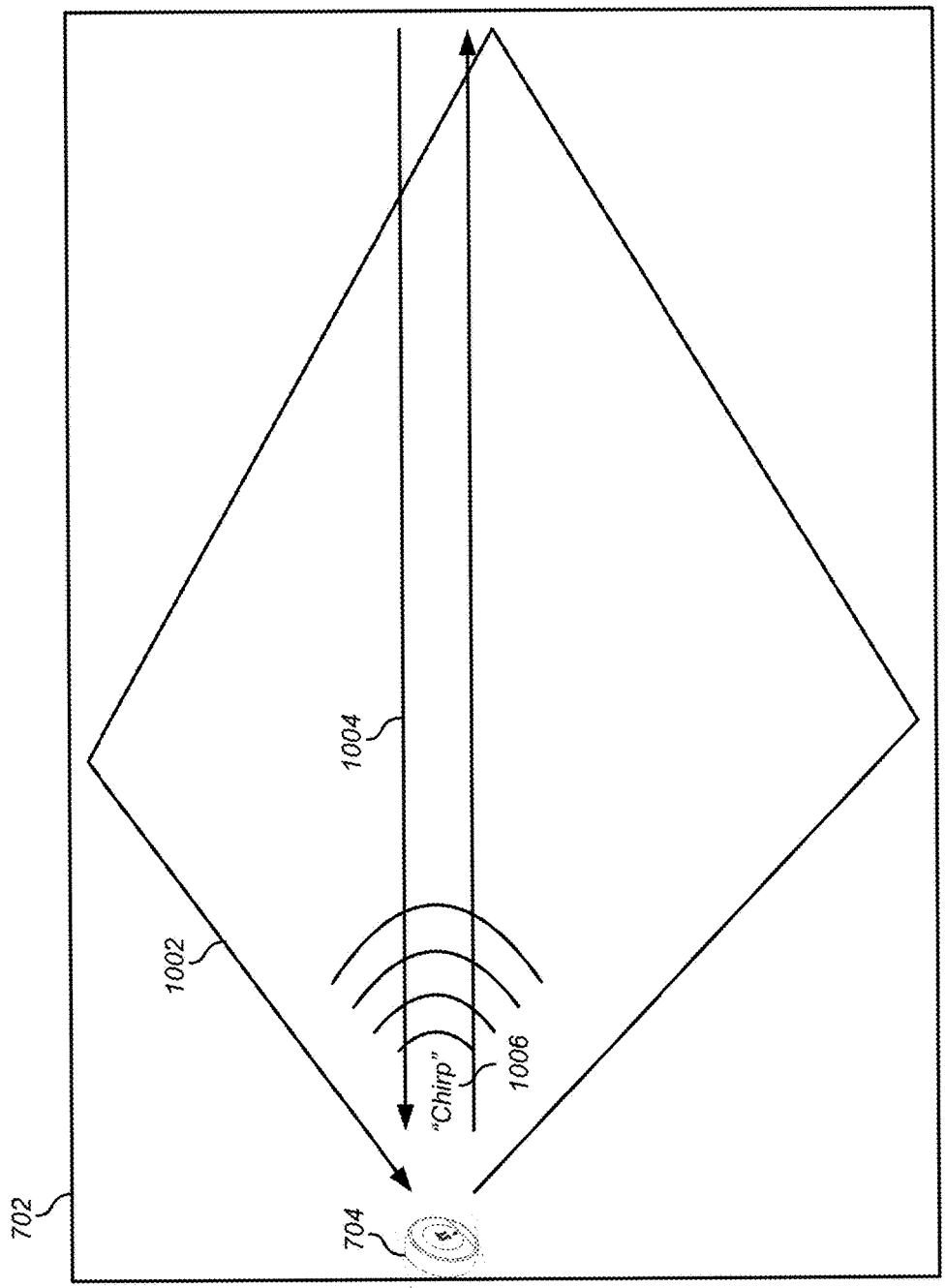
FIG. 10 illustrates a diagram of a smart-home device determining an impulse response for an enclosure, according to some embodiments.

FIG. 10 illustrates a diagram of a smart-home device determining an impulse response for an enclosure, according to some embodiments. In order to estimate the impulse response for an enclosure, a sound approximating an ideal acoustic impulse can be emitted by the smart home device 704. Because an ideal acoustic impulse that is infinitesimally narrow in time cannot exist in reality, a sound approximating an ideal acoustic impulse can be generated. For example, a loud, abrupt sound such as a chirp, a beep, a click, and/or the like, may be emitted by the smart home device 704. In the example of FIG. 10, a chirp 1006 will be emitted. As the sound approximating the ideal acoustic impulse reverberates around the enclosure 702, reflections can be received by the smart home device 704. Direct reflections 1004 having the most acoustic energy will generally be received first, followed by higher-order reflections 1002. The smart home device 704 can record the reflections 1002, 1004 as they are received.

A recording of the enclosure response to the acoustic impulse can be used directly as an impulse response. The recording can be sampled by a digital signal-processing system and stored as a representation in either the time domain or the frequency domain. This stored impulse response can then be convolved with phonemes in a master speech dictionary to generate a custom speech dictionary for the enclosure 702. The acoustic impulse response encodes the way in which sound reverberates through the enclosure 702. By combining the impulse response with phonemes in a master speech dictionary, the resulting custom speech dictionary will be approximately equivalent to a speech dictionary of words actually spoken in the enclosure 702. It has been discovered that the acoustic impulse response of the enclosure 702 is approximately the same no matter where a human user stands in the enclosure 702. Therefore, the sound emitted from the smart home device 704 may be subject to the same acoustic impulse response as a sound emitted from a human user in the corner of the enclosure 702. In addition to emitting an approximate acoustic impulse and measuring the subsequent response, some embodiments may also use a sine-sweep method that emits a sound that covers the entire audible frequency range. The resulting recording can go through a deconvolution process to produce an impulse response.

In some embodiments, the process of generating an acoustic impulse response for the enclosure 702 may be carried out during a learning interval. Because this process may require the smart home device 704 to generate audible signals and to record the room response without significant interference from other background noise, it may be beneficial to schedule such a learning interval during times when such circumstances will be present. The learning interval may be scheduled at any time, however, some embodiments will schedule the learning interval during the first week or two following the installation of the smart home device 704 in the enclosure 702. For example, the learning interval may be scheduled between 12:00 AM and 2:00 AM, or during similar hours when other acoustic interference is unlikely. In some embodiments, the smart home device 704 may receive environmental inputs from sensors or other smart home devices to indicate when a learning interval should begin. For example, the smart home device 704 may receive environmental inputs from a PIR sensor indicating that the enclosure is unoccupied. The smart home device 704 may also receive inputs from other smart home appliances, such as a dishwasher and/or refrigerator, indicating that they are not generating background noise. These inputs may trigger the beginning of a learning interval during which the acoustic impulse response of the enclosure can be determined.

Figure 11:
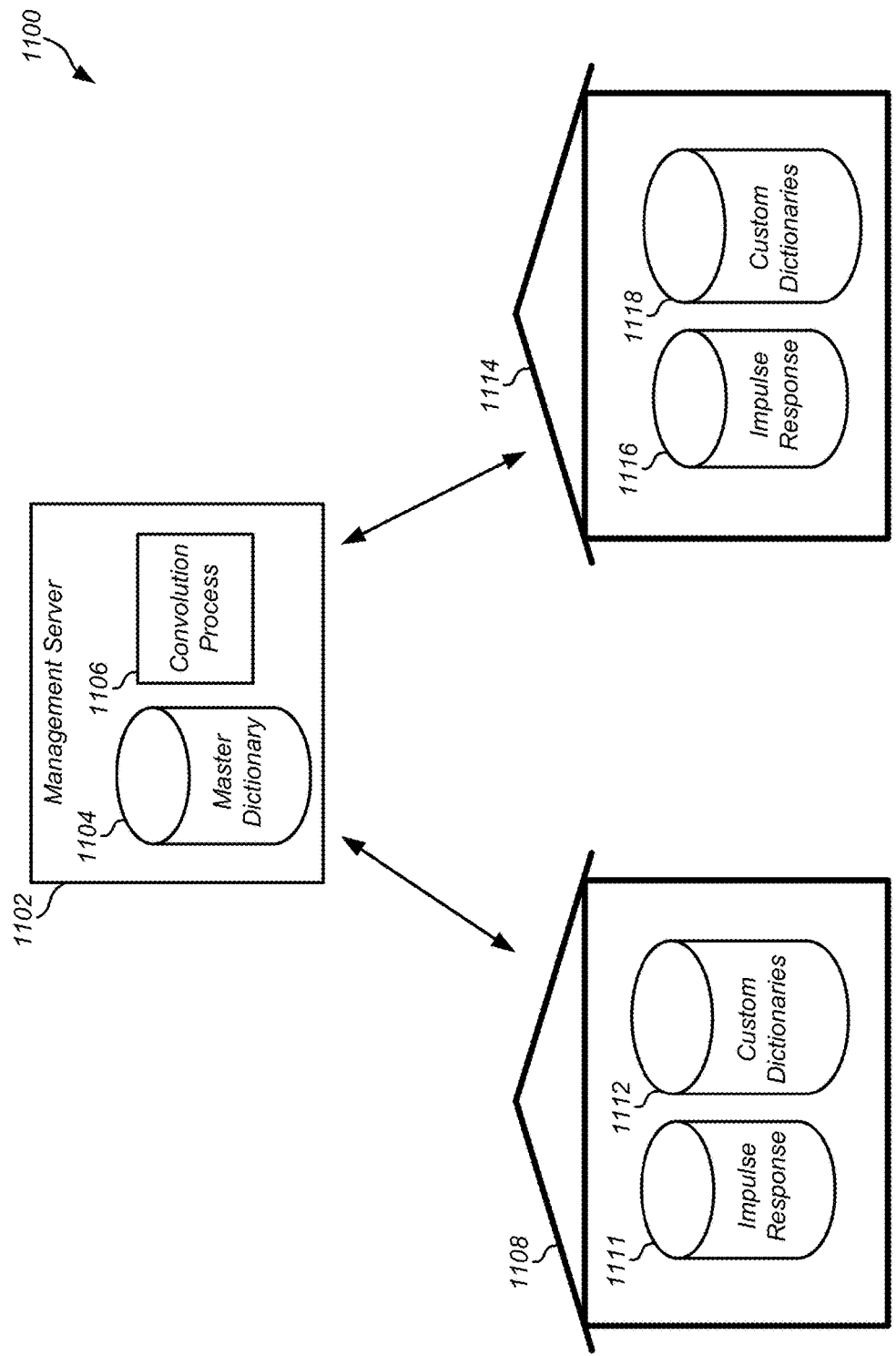
FIG. 11 illustrates a network diagram of a plurality of smart-home device networks connected to a management server, according to some embodiments.

FIG. 11 illustrates a network diagram of a plurality of smart-home device networks connected to a management server, according to some embodiments. In some embodiments, the smart home devices described herein will have rather stringent power requirements. In some cases, they may need to operate on battery power or steal power from other home systems, such as an HVAC system. In order to meet these power requirements, the smart home devices may use relatively low power microprocessors that spend a significant portion of their lifetime in a sleep mode or low-power mode. Because convolution and other digital signal processing algorithms may require a significant amount of processing power, some embodiments may send the acoustic impulse response of an enclosure to a management server 1102 in order to generate a custom speech dictionary.

A home 1108 may include more than one smart home device. In some embodiments, the home 1108 may include a smart home device network that includes many smart home devices, including but not limited to hazard detectors, thermostats, door entry systems, security systems, smart appliances, and so forth. One or more electronic devices in the smart home device network can store impulse responses 1111 and custom speech dictionaries 1112 for use by the local smart home devices. For example, a hazard detector may store an impulse response for the room in which it is installed, as well as a custom speech dictionary generated specifically for that room. In another example, a local computer (desktop computer, server, laptop computer, etc.) may store the custom speech dictionaries 1112 and impulse responses 1111 for the entire home 1108. Therefore, the impulse responses 1111 and custom speech dictionaries 1112 may be shared throughout the home 1108 with any of the smart home devices. This may be useful in cases where rooms within the home 1108 have similar acoustic impulse responses, or in cases where a single room has more than one smart home device installed.

In some embodiments, the electronic device that is part of the local smart home device network may be used to convert a master speech dictionary into a custom speech dictionary based on one of the impulse responses 1111. For example, a hazard detector in the home 1108 may capture an impulse response for a room in which the hazard detector is installed. The hazard detector may use a very low-power processor, and thus it may be inefficient and/or costly to generate the custom speech dictionary using the hazard detector. The hazard detector may transmit the impulse response over a local smart home device network to a higher-power device, such as a controller for a security system or a general-purpose computer. In some embodiments, the smart home device can transmit the impulse response to the management server 1102, and the management server 1102 can generate the custom speech dictionary.

The management server 1102 may include a speech dictionary data store 1104 that includes a master speech dictionary. The master speech dictionary may be a comprehensive dictionary of phonemes that is language-specific. In some embodiments, the master speech dictionary may be provided by speech recognition algorithms that are trained with 50,000 to 100,000 different utterances of each word in a human language that are collected to build a library of different ways to pronounce each phoneme. Therefore, the speech dictionary data store 1104 may store a plurality of master speech dictionaries, each for a different language, accent, dialect, etc. In some embodiments, the master speech dictionary may be used to generate custom speech dictionaries for many different smart home devices in many different homes. Additionally, the master speech dictionary may be used as a baseline or default speech dictionary for many different smart home devices in many different homes. Management server 1102 may also include a convolution process 1106 that operates on one or more processors. The convolution process may convolve impulse responses for enclosures with one or more of the master dictionaries to generate custom dictionaries specific to a particular enclosure. Continuing with the example above, the hazard detector in the home 1108 can pass the impulse response for the room in which the hazard detector is installed to the management server 1102, where the convolution process 1106 combines the impulse response with a master speech dictionary of the appropriate language from the dictionary data store 1104 to generate a custom speech dictionary specific to the room in which the hazard detector is installed.

The management server 1102 may be in communication with a relatively large number of homes. For example, a second home, such as home 1114 may also transmit impulse responses 1116 to the management server 1102 in order to generate custom speech dictionaries 1118. The custom speech dictionaries can be stored in the speech dictionary data store 1104 at the management server 1102 and/or stored in the custom dictionaries 1112, 1118 in the homes 1108, 1114 respectively. In some cases, the management server 1102 may receive an impulse response from a home that is similar to that of a previously received impulse response for another home. For example, an impulse response from home 1108 may be similar to an impulse response received from home 1114. It may be that the enclosure within 1108 has very similar acoustic properties to an enclosure within home 1114. In this case, instead of generating a new custom speech dictionary, the management server 1102 can send one of the custom dictionaries 1112 for home 1108 to home 1114. If the custom dictionary was previously stored in the speech dictionary data store 1104 of the management server 1102, it can be sent directly from the management server 1102. Alternatively or additionally, the management server 1102 could receive an impulse response from home 1114, determine that it is similar to one of the impulse responses 1111 for home 1108, request the custom dictionary from home 1108, then send that custom dictionary to the custom dictionaries 1118 of home 1114.

After installation, the management server 1102 can transmit a copy of the master speech dictionary from the speech dictionary data store 1104 to smart home devices in the home 1108. This initial master speech dictionary can be used as a baseline for smart home devices in the home 1108. After a learning interval, each of the smart home devices may analyze the impulse response of their respective enclosures and have custom speech dictionaries generated for those enclosures, replacing the master speech dictionary that was used as a baseline.

Figure 12:
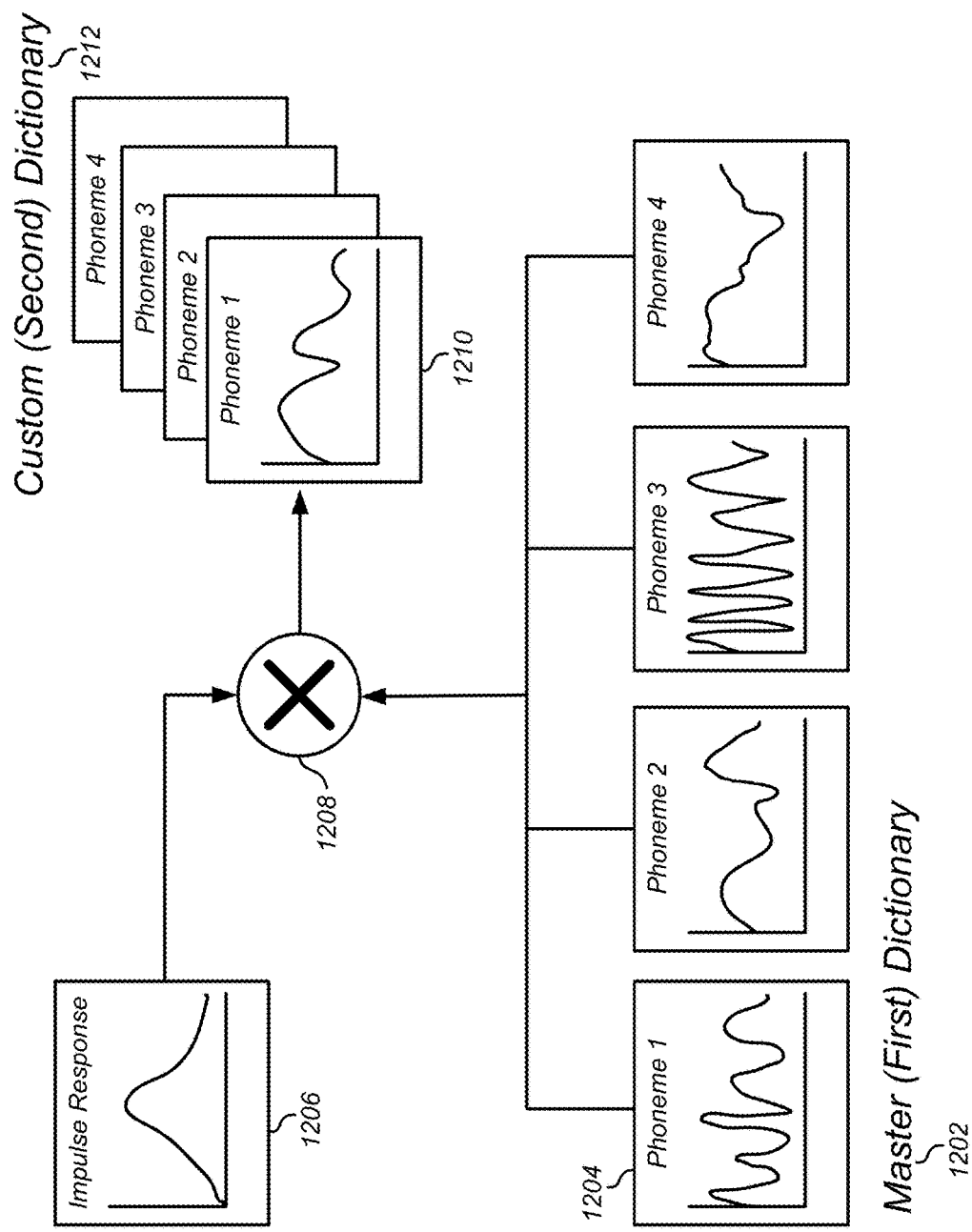
FIG. 12 illustrates a flow diagram of how a master speech dictionary can be used to generate a custom speech dictionary, according to some embodiments.

FIG. 12 illustrates a flow diagram of how a master speech dictionary can be used to generate a custom speech dictionary, according to some embodiments. In order to generate a custom speech dictionary 1212 from a master speech dictionary 1202 using an acoustic impulse response 1206, each phoneme 1204 in the master speech dictionary 1202 may be considered individually. Each of the phonemes 1204 may be processed sequentially by a mathematical operation that produces output phonemes that are modified versions of the original phonemes 1204. In some embodiments, this mathematical operation may be comprised of a convolution operation. In practice, both the phonemes 1204 and the acoustic impulse response 1206 may be stored as a sequence of discrete samples. Thus, a discrete convolution operation 1208 can be used to combine the two signals.

In some embodiments, a standard discrete convolution for two finite sequences of discrete samples can be used. For example, the sequence f[n] may be used for the acoustic impulse response 1206, and the sequence g[n] may be used for a first phoneme in the master speech dictionary 1202, and the output phoneme 1210 for the custom speech dictionary 1212, may be given by:

$$(f*g)[n] = \sum_{m=-\infty}^{\infty} f[m] \cdot g[n-m]$$

In other embodiments, other methods may be used to generate the custom speech dictionary from the acoustic impulse response 1206 and the master speech dictionary 1202. For example, a circular discrete convolution function may be used. Other operations may use continuous-time convolution using dedicated analog circuitry. These operations may be carried out in the time domain or in the frequency domain.

Figure 13:
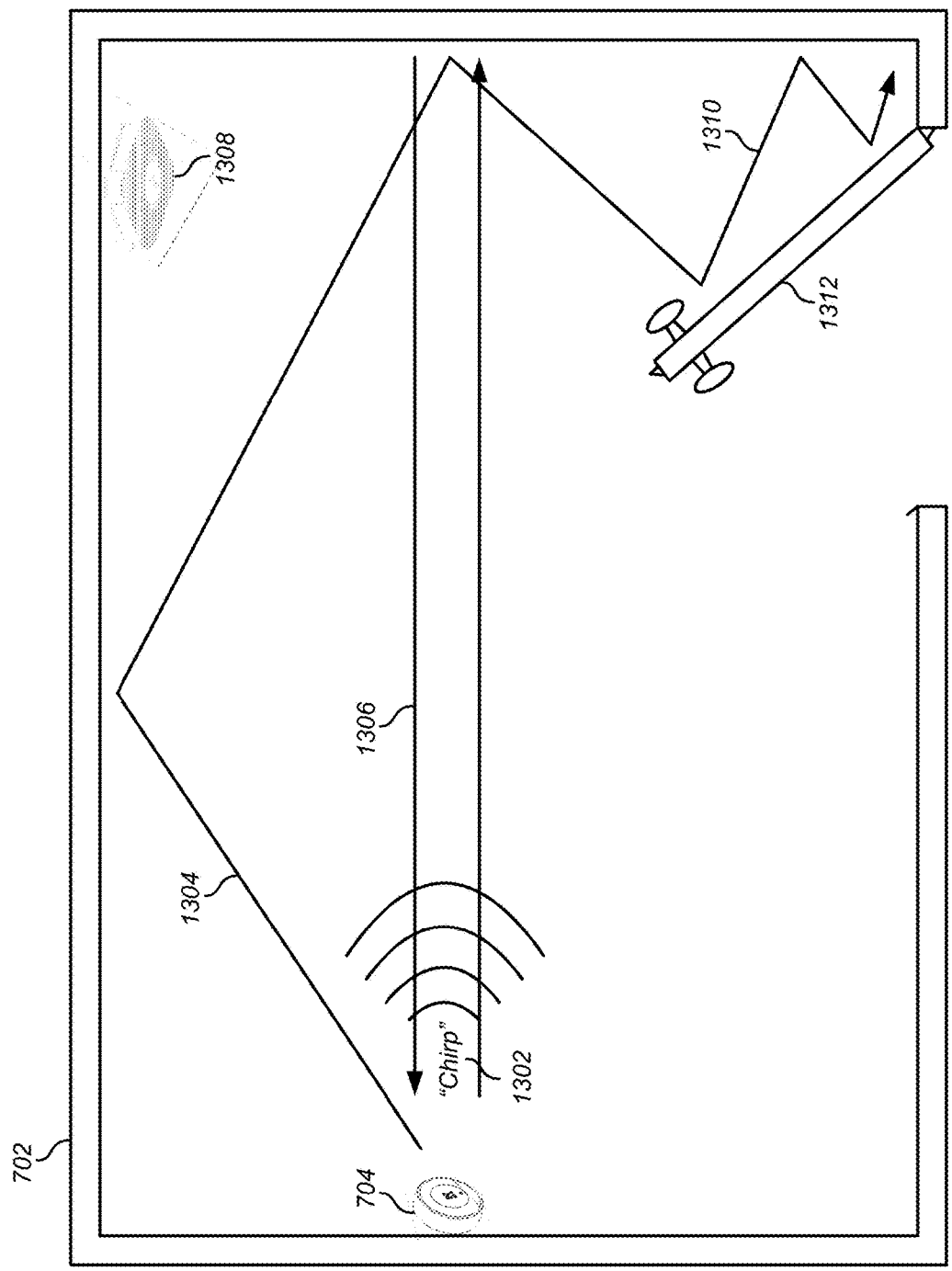
FIG. 13 illustrates a diagram of an enclosure having multiple states, according to some embodiments.

FIG. 13 illustrates a diagram of an enclosure having multiple states, according to some embodiments. In some embodiments, an enclosure 702 can change states when its acoustic properties are changed. In the example of FIG. 13, a door 1312 may be either open or shut. When the door 1312 is shut, the enclosure 702 will have an acoustic impulse response similar to that of FIG. 10. However, when the door 1312 is open, the room 702 will have a different acoustic impulse response. For example, reflections 1304 of the emitted sound 1302 approximating an acoustic impulse will be altered based on the open door 1312. In other examples, the enclosure 702 can change its state when a window is open/closed, when the room is occupied by the relatively large number of people (e.g., 3 people, 5 people, 8 people, 10 people, etc.), and so forth. Each of these changes in state can cause the reflections of the emitted sound 1302 to change.

The state of the room can be detected by one or more environmental sensors and/or inputs to the smart home device 704. For example, an occupancy sensor can provide an input that indicates that the room is occupied by more than five people. In another example, door/window sensors from a smart home security system can indicate an open/close state for the doors/windows in the enclosure 702. In another example, a time of day input may be used to determine that the doors and windows are likely locked and that the enclosure 702 is unoccupied (e.g. late at night). In another example, a user may provide an input on a mobile computing device or on an alarm system input pad that the security system will be in an "away" mode, thereby indicating that the doors/windows will be closed and the room will be in an unoccupied state. As described above, the smart home device 704 can receive these environmental/sensor inputs and determine a state for the enclosure 702. A lookup table may be used to store known enclosure states, and the lookup table maybe indexed by the environmental/sensor inputs. For example, inputs from the occupancy sensor and a sensor for the door 1312 may be used to index the lookup table and retrieve a state for an occupied enclosure 702 where the door 1312 is shut.

Once a state of the enclosure 702 is determined, custom speech dictionaries can be generated/used specifically for that enclosure state. Following the process described above, the smart home device 704 may institute a learning interval for generating an acoustic impulse response for the enclosure 702 in each known state. For example, an acoustic impulse response can be determined for the enclosure 702 when the door 1312 is open and when the door 1312 is closed. The acoustic impulse response for each room state can then be used to generate a custom speech dictionary for the room in each state using the process described above. Therefore, the smart home device 704 may store a plurality of different custom speech dictionaries that can be used depending on the state of the enclosure 702. For example, a first custom speech dictionary may be used when the enclosure 702 is in a first state (e.g. when the door 1312 is open), and a second custom speech dictionary may be used when the enclosure 702 is in a second state (e.g. when the door 1312 is closed).

In FIG. 13, a second smart home device 1308 may also be present in the enclosure 702. For example, the enclosure 702 may have a thermostat and a hazard detector installed. Because the acoustic impulse response of the enclosure 702 is approximately the same regardless of the location in the enclosure 702, the acoustic impulse response of the enclosure 702 may be approximately the same from the perspective of smart home device 704 and smart home device 1308. In these situations, an acoustic impulse response of the enclosure 702 may be determined by smart home device 704 or by smart home device 1308, and the resulting custom speech dictionary can be shared between both smart home devices 704, 1308. The custom speech dictionary can be shared via the local smart home device network, or through the Internet. For example, smart home device 704 may connect to a management server through the Internet provided by a local router within the home. The management server may then connect to smart home device 1308 over the Internet through the same router to deliver the custom speech dictionary provided by smart home device 704. Alternatively or additionally, some enclosures may have acoustic impulse responses that differ based on the location of the smart home device. In these enclosures, some embodiments may ascertain and acoustic impulse response for both smart home device 704 and smart home device 1308, and a custom speech dictionary can be generated for each smart home device 704, 1308.

Figure 14:
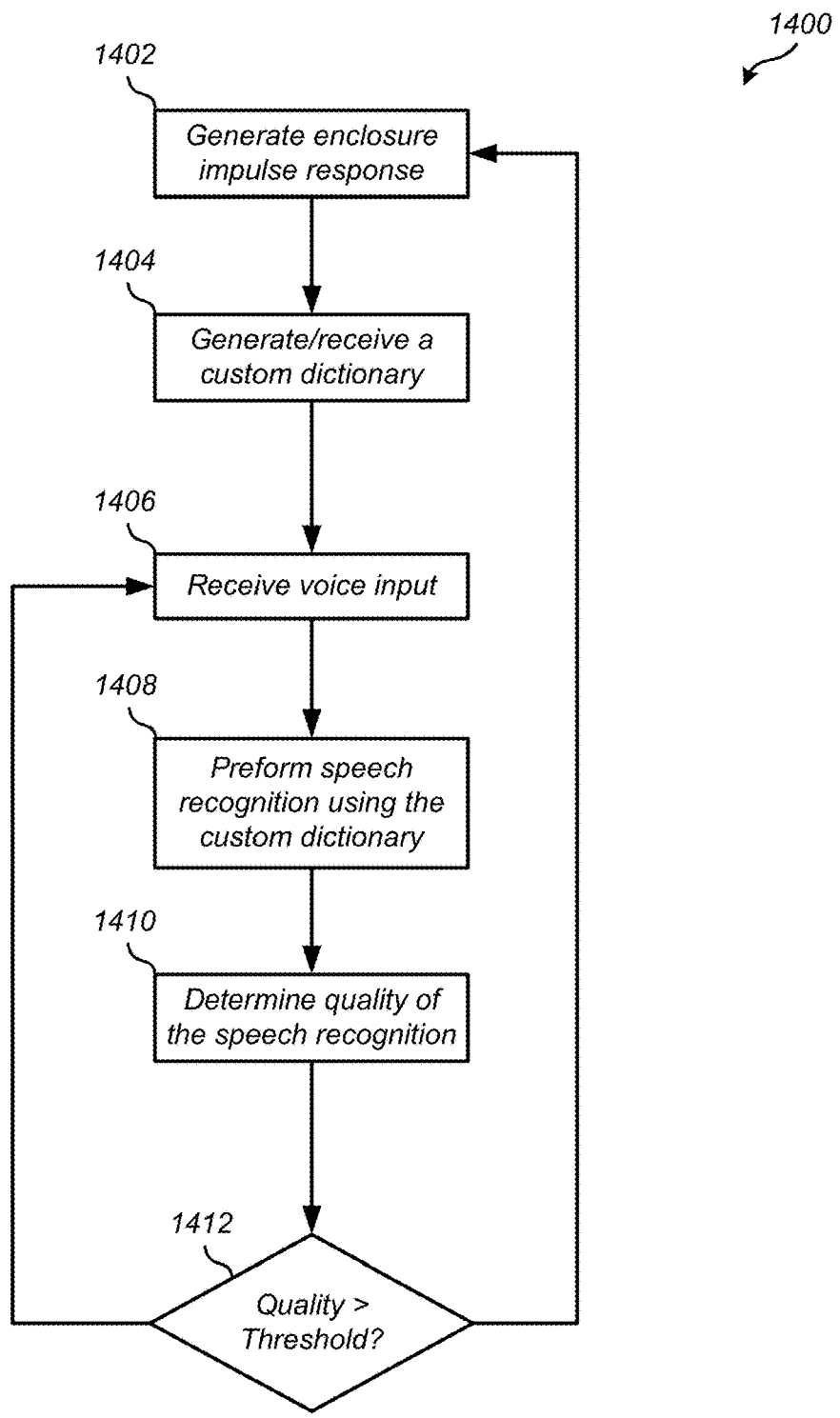
FIG. 14 illustrates a flowchart of a method for generating and/or using custom speech dictionaries for speech recognition in a smart-home device network, according to some embodiments.

FIG. 14 illustrates a flowchart of a method for generating and/or using custom speech dictionaries for speech recognition in a smart-home device network, according to some embodiments. This method may be carried out by a smart home device installed in an enclosure. The method may include generating an acoustic impulse response for the enclosure (1402) by a smart home device. The method may also include generating/receiving a custom speech dictionary for the enclosure based on the acoustic impulse response (1404). The custom speech dictionary may be generated by the smart home device or by a management server. These steps may be carried out as described in detail above. The method may also include receiving a voice input (1406). The voice input may include a voice command to a smart home device. The method may further include performing a speech recognition process on the received voice input using the custom speech dictionary (1408). Some embodiments may also include receiving environmental inputs and selecting a state of the enclosure. The state of the enclosure may be used to select among various custom speech dictionaries available for the enclosure.

After performing the speech recognition process, the method may include determining the quality of the speech recognition process (1410). If the quality is acceptable (e.g. above a threshold score), then the custom speech dictionary for the enclosure may continue to be used. However, if the equality is unacceptable (e.g. below a threshold score), then a new custom speech dictionary may be generated. In some cases, the custom speech dictionary may have been created based on an acoustic impulse response that was of low quality. For example, background noise or other acoustic interference may have been occurring as the acoustic impulse response was being received by the smart home device. In this case, the poor quality of the speech recognition process may be used to determine that the acoustic impulse response was not correct. In response, the method may reinstitute a learning interval such that a new, higher-quality, acoustic impulse response for the enclosure may be ascertained and used to generate a new custom speech dictionary.

In some embodiments, the poor quality of the speech recognition process may result from selecting the wrong state for the enclosure. In cases where no state has been associated with the enclosure, the method may determine a state and generate multiple custom speech dictionaries. For example, a room may initially be associated with a single default state. The acoustic impulse response may be captured when all of the doors and windows of the enclosure are closed, and a custom speech dictionary may be generated accordingly. However, during the speech recognition process, one or more doors or windows of the enclosure may be open. This may change the acoustic characteristics of the room enough that the custom dictionary is no longer producing optimal results. In this case, the smart home device can begin analyzing environmental and smart home inputs and determine a plurality of states associated with the room. Then, acoustic impulse responses can be ascertained and used to create custom speech dictionaries for each room state. Alternatively, the smart home device may determine that the environmental and/or smart home inputs are not correctly identifying the proper state of the room. For example, a smart home device in the corner of a room may not accurately detect the occupancy of the room. Therefore, some embodiments may disregard the occupancy sensor in these situations.

The quality of the speech recognition can be determined based on how easily the phonemes of the recorded sound can be matched to phonemes in the custom speech dictionary. The speech recognition process can generate a score that indicates how closely the phonemes matched. The score can be compared to a threshold score and used to determine whether the quality is sufficient. In some embodiments, the quality of the speech recognition process can be determined based on user inputs. For example, if a user has to repeat the command multiple times, it can be assumed that the speech recognition process was not correctly interpreting the voice commands. In this case, repeated voice commands above the threshold of one voice command may indicate insufficient quality of the speech recognition process. In another example, a smart home device may repeat the command back to the user, and the user may provide input accepting or rejecting the interpretation of the command. For instance, in response to a voice command "increase the temperature by 5°," the smart home device can say "okay, increasing the temperature by 5°." If the user subsequently manually changes the temperature on the smart home device, this can be an indication that the speech recognition process did not correctly interpret the voice command.

Figure 15:
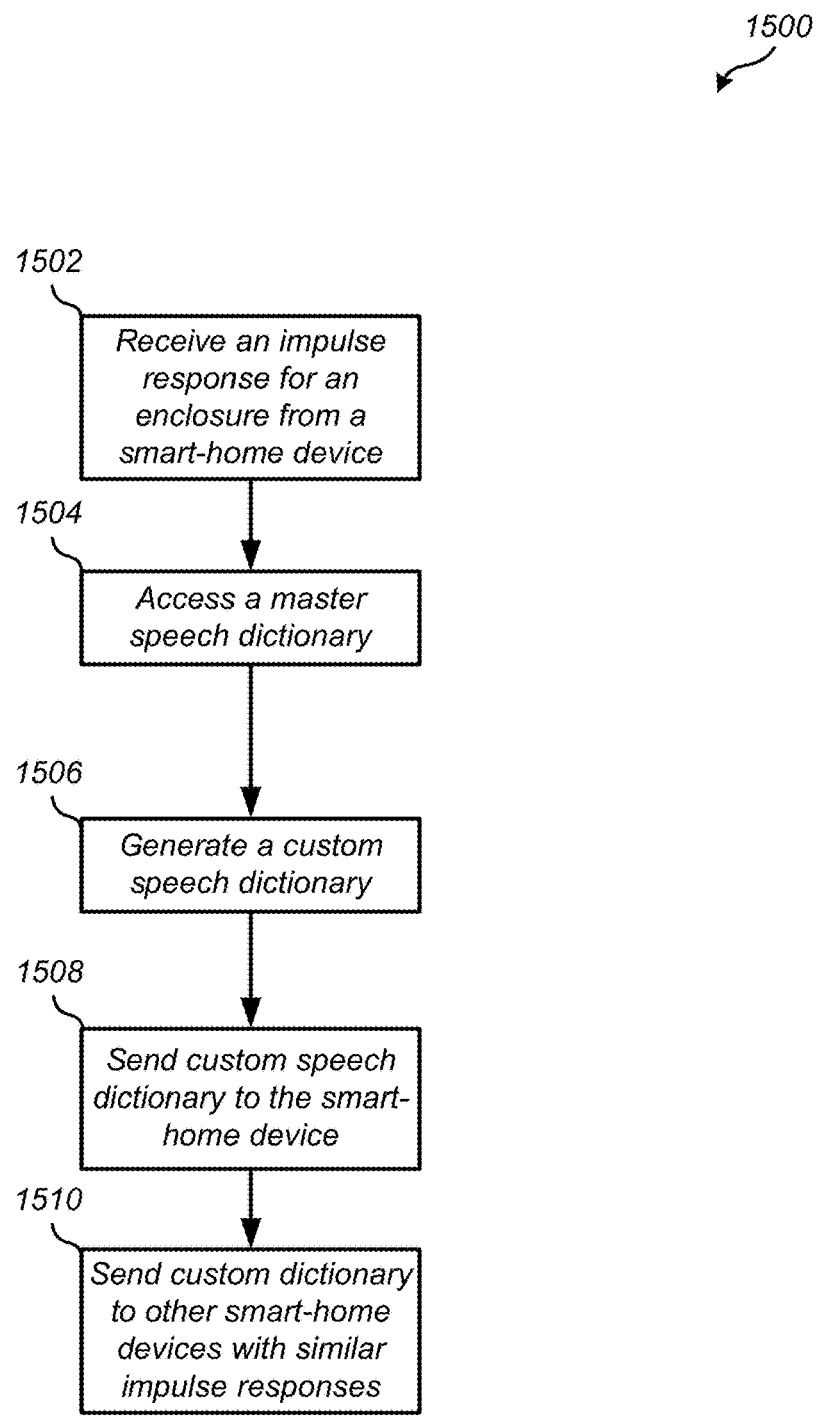
FIG. 15 illustrates a flowchart of a method for generating and/or distributing custom speech dictionaries for speech recognition at a management server, according to some embodiments.

FIG. 15 illustrates a flowchart of a method for generating and/or distributing custom speech dictionaries for speech recognition at a management server, according to some embodiments. This method may be carried out by a management server in communication with one or more smart home device networks remotely located at user's homes. In some embodiments, the smart home device may also transmit additional information to the management server, such as a preferred language, and/or characteristics of the enclosure (e.g., master bedroom, kitchen, hallway, dining room, kids bedroom, den, office, etc.). The method may include receiving an acoustic impulse response for an enclosure from a smart home device (1502). The management server may then access a master speech dictionary for the language used by the smart home device, and generate a custom speech dictionary (1506) as described in detail above. This custom speech dictionary can then be sent to the smart home device (1508).

In some embodiments, the management server may service requests to generate custom speech dictionaries from many different smart home devices installed in many different homes. Because customizing a speech dictionary may require a considerable amount of processing power, it may be advantageous to reuse previously generated custom speech dictionaries when appropriate. Therefore, the method may include sending a previously generated custom speech dictionary to other smart home devices with similar impulse responses or enclosure characteristics (1510). For example, the management server may receive an acoustic impulse response from a smart home device. The management server may then compare the received acoustic impulse response to previously received acoustic impulse responses to see if there is a close match. If there is a close match, then the custom speech dictionary generated from the previously received acoustic impulse response can be sent to the smart home device without regenerating the custom speech dictionary. In some embodiments, the search for matching impulse responses can be narrowed based on room characteristics. For example, the management server may receive a request from a smart home device for a master bedroom. The management server can then limit its search to impulse responses from other master bedrooms. The management server can also expand the search to similar room types, such as kids bedrooms or guest bedrooms.

In some embodiments, smart home device networks may have access to a structural blueprint of the home. In these embodiments, the characteristics of the room received by the management server may include dimensions and building materials. Information such as dimensions and building materials may be automatically downloaded from a local planning commission or other repository where building plans are stored and accessible over the Internet. This information may also be entered manually by a user. Some smart home devices may include sensors, such as microwave or radar sensors that can be used to determine distances from the smart home devices. These characteristics can also be used to reuse custom speech dictionaries. For example, the management server may receive a request from a smart home device installed in a 10'×10' room with an 8' ceiling and regular drywall. The management server could then find a previously generated custom speech dictionary for a room matching these characteristics and send this custom speech dictionary to the smart home device installed in the 10'×10' room. In fact, when room characteristics are used, a requesting smart home device need not always ascertain an acoustic impulse response for its enclosure. Instead, the smart home device can simply receive or determine a sufficient level of detail regarding characteristics of the enclosure, and send these details to the management server. The management server can then match these characteristics to existing rooms for which custom speech dictionaries have already been generated. These embodiments may be useful for smart home devices that are not equipped with sound generation systems for generating an approximation of an acoustic impulse. These embodiments may also be useful for smart home devices that have not yet instituted a learning interval, or for which background noise is present such that ascertaining the acoustic impulse response of the enclosure is not feasible.

The method of FIG. 15 has been described above as being carried out by management server. However, not all embodiments are so limited. In other embodiments, the method of FIG. 15 may be carried out by a local electronic device in the smart home network, such as a laptop computer, desktop computer, tablet computer, smart phone, and/or the like. In some embodiments, this method may also be carried out by a smart home device itself. If carried out by smart home device, some devices may wait until they are not busy carrying out other smart home functions. For instance, a thermostat may generate custom speech dictionaries late at night when it is typically less active.

Figure 16:
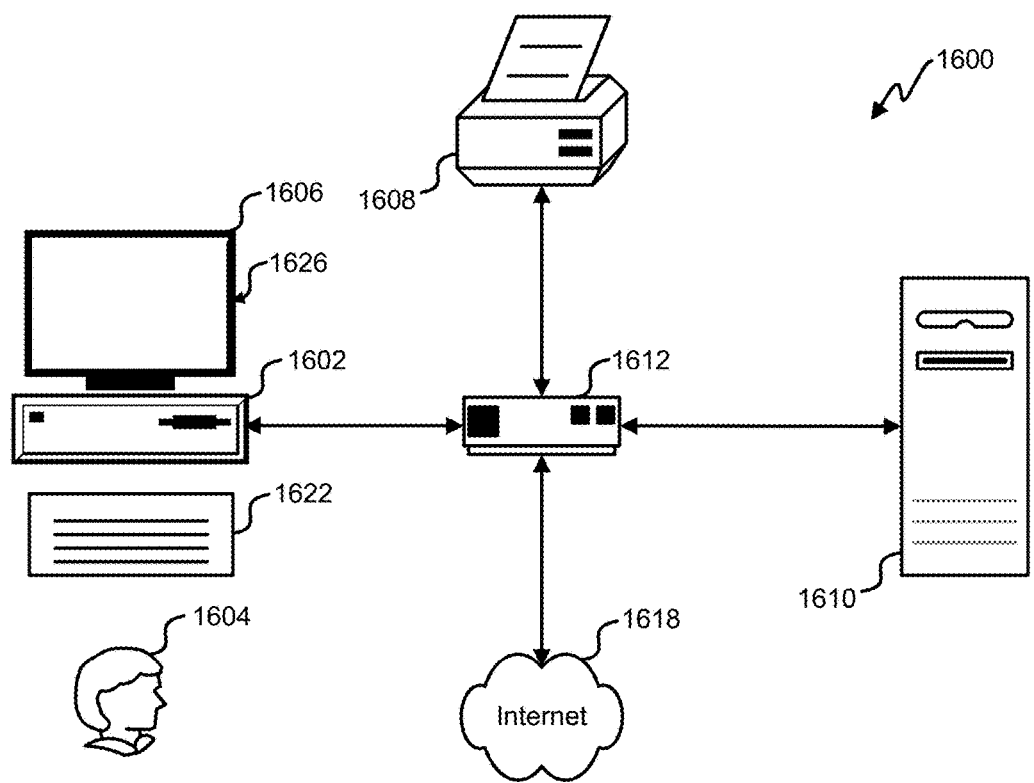
FIG. 16 illustrates a block diagram of an embodiment of a computer system, according to some embodiments.

Referring next to FIG. 16, an exemplary environment with which embodiments may be implemented is shown with a computer system 1600 that can be used by a user 1604 to remotely control, for example, one or more of the sensor-equipped smart-home devices according to one or more of the embodiments. The computer system 1610 can alternatively be used for carrying out one or more of the server-based processing paradigms described hereinabove or as a processing device in a larger distributed virtualized computing scheme for carrying out the described processing paradigms, or for any of a variety of other purposes consistent with the present teachings. The computer system 1600 can include a computer 1602, keyboard 1622, a network router 1612, a printer 1608, and a monitor 1606. The monitor 1606, processor 1602 and keyboard 1622 are part of a computer system 1626, which can be a laptop computer, desktop computer, handheld computer, mainframe computer, etc. The monitor 1606 can be a CRT, flat screen, etc.

A user 1604 can input commands into the computer 1602 using various input devices, such as a mouse, keyboard 1622, track ball, touch screen, etc. If the computer system 1600 comprises a mainframe, a designer 1604 can access the computer 1602 using, for example, a terminal or terminal interface. Additionally, the computer system 1626 may be connected to a printer 1608 and a server 1610 using a network router 1612, which may connect to the Internet 1618 or a WAN.

The server 1610 may, for example, be used to store additional software programs and data. In one embodiment, software implementing the systems and methods described herein can be stored on a storage medium in the server 1610. Thus, the software can be run from the storage medium in the server 1610. In another embodiment, software implementing the systems and methods described herein can be stored on a storage medium in the computer 1602. Thus, the software can be run from the storage medium in the computer system 1626. Therefore, in this embodiment, the software can be used whether or not computer 1602 is connected to network router 1612. Printer 1608 may be connected directly to computer 1602, in which case, the computer system 1626 can print whether or not it is connected to network router 1612.

Figure 17:
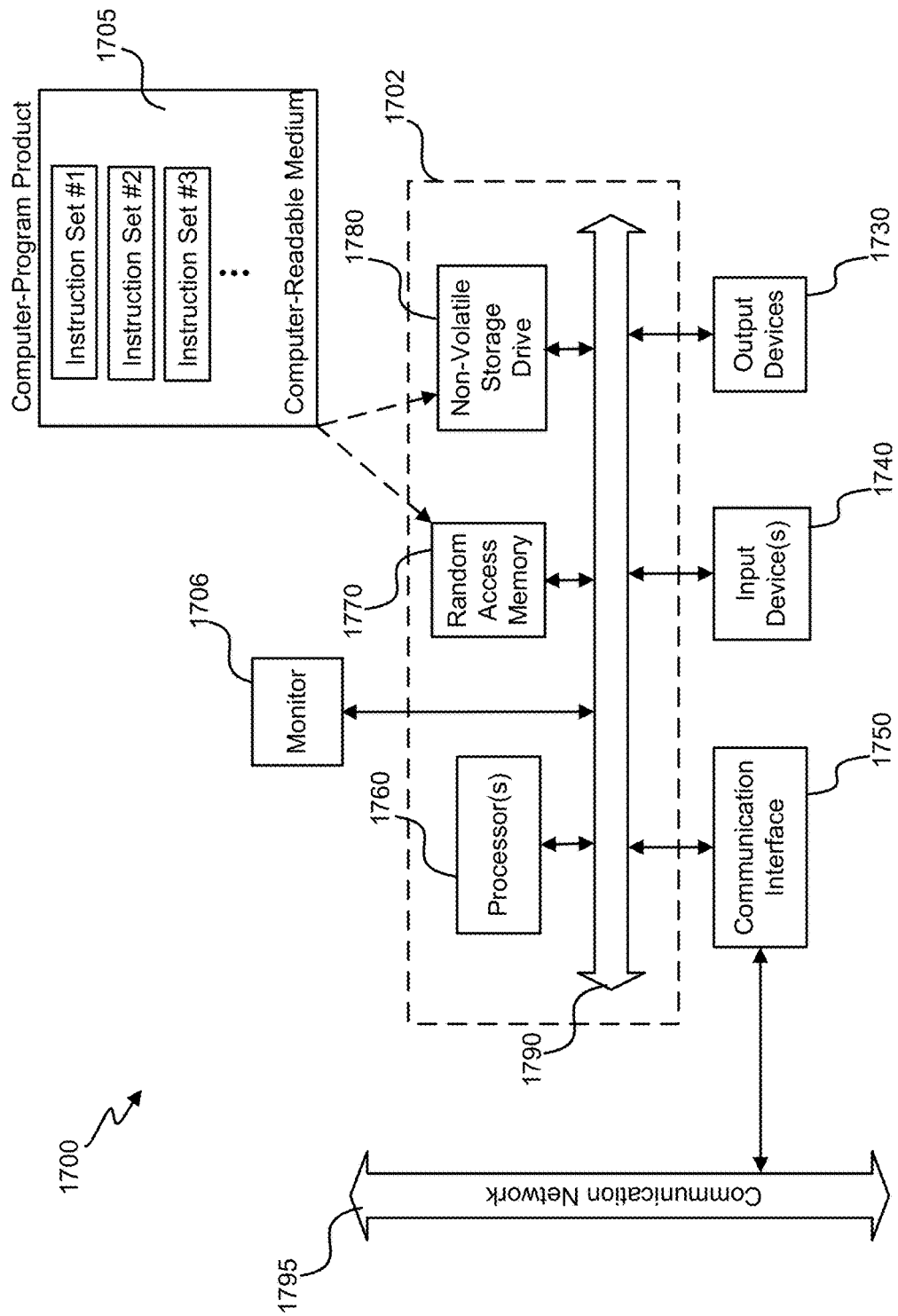
FIG. 17 illustrates a block diagram of an embodiment of a special-purpose computer, according to some embodiments.

With reference to FIG. 17, an embodiment of a special-purpose computer system 1700 is shown. For example, one or more intelligent components, processing engine 206 and components thereof may be a special-purpose computer system 1700. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1726, it is transformed into the special-purpose computer system 1700.

Special-purpose computer system 1700 comprises a computer 1702, a monitor 1706 coupled to computer 1702, one or more additional user output devices 1730 (optional) coupled to computer 1702, one or more user input devices 1740 (e.g., keyboard, mouse, track ball, touch screen) coupled to computer 1702, an optional communications interface 1750 coupled to computer 1702, a computer-program product 1705 stored in a tangible computer-readable memory in computer 1702. Computer-program product 1705 directs system 1700 to perform the above-described methods. Computer 1702 may include one or more processors 1760 that communicate with a number of peripheral devices via a bus subsystem 1790. These peripheral devices may include user output device(s) 1730, user input device(s) 1740, communications interface 1750, and a storage subsystem, such as random access memory (RAM) 1770 and non-volatile storage drive 1780 (e.g., disk drive, optical drive, solid state drive), which are forms of tangible computer-readable memory.

Computer-program product 1705 may be stored in non-volatile storage drive 1780 or another computer-readable medium accessible to computer 1702 and loaded into memory 1770. Each processor 1760 may comprise a microprocessor, such as a microprocessor from Intel® or Advanced Micro Devices, Inc.®, or the like. To support computer-program product 1705, the computer 1702 runs an operating system that handles the communications of product 1705 with the above-noted components, as well as the communications between the above-noted components in support of the computer-program product 1705. Exemplary operating systems include Windows® or the like from Microsoft Corporation, Solaris® from Sun Microsystems, LINUX, UNIX, and the like.

User input devices 1740 include all possible types of devices and mechanisms to input information to computer system 1702. These may include a keyboard, a keypad, a mouse, a scanner, a digital drawing pad, a touch screen incorporated into the display, audio input devices such as voice recognition systems, microphones, and other types of input devices. In various embodiments, user input devices 1740 are typically embodied as a computer mouse, a trackball, a track pad, a joystick, wireless remote, a drawing tablet, a voice command system. User input devices 1740 typically allow a user to select objects, icons, text and the like that appear on the monitor 1706 via a command such as a click of a button or the like. User output devices 1730 include all possible types of devices and mechanisms to output information from computer 1702. These may include a display (e.g., monitor 1706), printers, non-visual displays such as audio output devices, etc.

Communications interface 1750 provides an interface to other communication networks and devices and may serve as an interface to receive data from and transmit data to other systems, WANs and/or the Internet 1618. Embodiments of communications interface 1750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1750 may be coupled to a computer network, to a FireWire® bus, or the like. In other embodiments, communications interface 1750 may be physically integrated on the motherboard of computer 1602, and/or may be a software program, or the like.

RAM 1770 and non-volatile storage drive 1780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1770 and non-volatile storage drive 1780 may be configured to store the basic programming and data constructs that provide the functionality of various embodiments of the present invention, as described above.

Software instruction sets that provide the functionality of the present invention may be stored in RAM 1770 and non-volatile storage drive 1780. These instruction sets or code may be executed by the processor(s) 1760. RAM 1770 and non-volatile storage drive 1780 may also provide a repository to store data and data structures used in accordance with the present invention. RAM 1770 and non-volatile storage drive 1780 may include a number of memories including a main random access memory (RAM) to store instructions and data during program execution and a read-only memory (ROM) in which fixed instructions are stored. RAM 1770 and non-volatile storage drive 1780 may include a file storage subsystem providing persistent (non-volatile) storage of program and/or data files. RAM 1770 and non-volatile storage drive 1780 may also include removable storage systems, such as removable flash memory.

Bus subsystem 1790 provides a mechanism to allow the various components and subsystems of computer 1702 to communicate with each other as intended. Although bus subsystem 1790 is shown schematically as a single bus, alternative embodiments of the bus subsystem may utilize multiple busses or communication paths within the computer 1702.

What is claimed is:

1. A method for customizing speech-recognition dictionaries for different smart-home environments, the method comprising:
   generating, at a smart-home device mounted in an enclosure, an acoustic impulse response for the enclosure;
   receiving, by the smart-home device, an audio signal captured in the enclosure;
   performing, by the smart-home device, a speech-recognition process on the audio signal using a second speech dictionary that was generated by convolving the acoustic impulse response with a first speech dictionary prior to receiving the audio signal captured in the enclosure, wherein the second speech dictionary comprises a collection of phonemes that are compared to phonemes in the audio signal by the speech-recognition process; and
   causing a smart-home system to be controlled based on results of the speech-recognition process on the audio signal.

2. The method of claim 1, further comprising:
   sending the acoustic impulse response from the smart-home device to a management server; and
   receiving, by the smart-home device and from the management server, the second speech dictionary, wherein the management server convolved the acoustic impulse response captured by the smart-home device with the first speech dictionary.

3. The method of claim 1, further comprising:
   generating, by the smart-home device, a sound approximating an ideal acoustic impulse;
   recording, by the smart-home device, an acoustic response of the enclosure to the sound approximating an ideal acoustic impulse; and
   generating the acoustic impulse response for the enclosure from the acoustic response of the enclosure to the sound approximating an ideal acoustic impulse.

4. The method of claim 3, wherein the acoustic impulse response for the enclosure is generated from the acoustic response of the enclosure.

5. The method of claim 3, wherein the sound approximating the ideal acoustic impulse comprises an electronic click or chirp generated by the smart-home device.

6. The method of claim 3, wherein generating the sound approximating the ideal acoustic impulse and recording the acoustic response of the enclosure occur during a learning interval of the smart-home device.

7. The method of claim 6, wherein the learning interval comprises a time interval within two weeks of an installation of the smart-home device.

8. A smart home device comprising:
   a recording device;
   one or more environmental sensors;
   one or more processors;
   one or more memory devices comprising instructions that, when executed by the one or more processors, cause the one or more processors to perform operations comprising:
      generating an acoustic impulse response for the enclosure in which the smart-home device is installed;
      receiving, through the recording device, an audio signal captured in the enclosure;
      performing, by the one or more processors, a speech-recognition process on the audio signal using a second speech dictionary that was generated by convolving the acoustic impulse response with a first speech dictionary prior to receiving the audio signal captured in the enclosure, wherein the second speech dictionary comprises a collection of phonemes that are compared to phonemes in the audio signal by the speech-recognition process; and
      causing a smart-home system to be controlled based on results of the speech-recognition process on the audio signal.

9. The smart-home device of claim 8, further comprising a wireless network device, wherein the operations further comprise:
   sending the acoustic impulse response from the smart-home device to a management server through the wireless network device; and
   receiving, from the management server through the wireless network device, the second speech dictionary, wherein the management server convolves the acoustic impulse response captured by the smart-home device with the first speech dictionary to generate the second speech dictionary.

10. The smart-home device of claim 8, wherein the smart-home device is a hazard detector and the one or more environmental sensors comprises a smoke sensor.

11. The smart-home device of claim 8, wherein the smart-home device is a thermostat and the one or more environmental sensors comprises a temperature sensor.

12. The smart-home device of claim 8, wherein the enclosure comprises a room within a home.

13. The smart-home device of claim 8, wherein the operations further comprise:
   receiving input from the one or more environmental sensors indicating that the enclosure is in a first state, wherein the second speech dictionary is used by the speech-recognition process when the enclosure is in the first state.

14. The smart-home device of claim 13, wherein the operations further comprise:
   receiving input from the one or more environmental sensors indicating that the enclosure is in a second state;
   generating a second acoustic impulse response for the enclosure in the second state;
   receiving, through the recording device, a second audio signal captured in the enclosure while the enclosure is in the second state; and
   performing, by the one or more processors, the speech-recognition process on the audio signal using a third speech dictionary generated by convolving the second acoustic impulse response with the first speech dictionary.

15. The smart-home device of claim 14, wherein:
   when the enclosure is in the first state, a door or window of the enclosure is closed; and
   when the enclosure is in the second state, the door or window of the enclosure is open.

16. A non-transitory, computer-readable medium comprising instructions that, when executed by one or more processors, cause the one or more processors to perform operations comprising:
- generating an acoustic impulse response for the enclosure in which the smart-home device is installed;
- receiving, through a recording device, an audio signal captured in the enclosure;
- performing, by the one or more processors, a speech-recognition process on the audio signal using a second speech dictionary that was generated by convolving the acoustic impulse response with a first speech dictionary prior to receiving the audio signal captured in the enclosure, wherein the second speech dictionary comprises a collection of phonemes that are compared to phonemes in the audio signal by the speech-recognition process; and
- causing a smart-home system to be controlled based on results of the speech-recognition process on the audio signal.

17. The non-transitory, computer-readable medium of claim 16, wherein the first speech dictionary is stored at the management server and available to a plurality of smart-home devices in a plurality of enclosures.

18. The non-transitory, computer-readable medium of claim 16, wherein the operations further comprise:
- identifying a first user of the smart-home device, wherein the second speech dictionary is further personalized to the first user;
- determining that the audio signal captured in the enclosure comprises human speech by the first user; and
- using the second speech dictionary for the speech-recognition process in response to determining that the audio signal captured in the enclosure comprises human speech by the first user.

19. The non-transitory, computer-readable medium of claim 16, wherein the operations further comprise:
- transmitting the acoustic impulse response to a second smart-home device in the enclosure over a local smart-home-device network.

20. The non-transitory, computer-readable medium of claim 16, wherein the operations further comprise:
- transmitting the second speech dictionary to a second smart-home device in the enclosure over a local smart-home-device network.

* * * * *